US010708450B2

(12) United States Patent
Omori

(10) Patent No.: US 10,708,450 B2
(45) Date of Patent: Jul. 7, 2020

(54) IMAGE PROCESSING APPARATUS, CONTROL METHOD THEREFOR, AND STORAGE MEDIUM

(71) Applicant: CANON KABUSHIKI KAISHA, Tokyo (JP)

(72) Inventor: Seiya Omori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/016,358

(22) Filed: Jun. 22, 2018

(65) Prior Publication Data

US 2019/0007567 A1 Jan. 3, 2019

(30) Foreign Application Priority Data

Jun. 29, 2017 (JP) .................. 2017-128047

(51) Int. Cl.
| | |
|---|---|
| *H04N 1/00* | (2006.01) |
| *H04N 1/44* | (2006.01) |
| *G06F 3/12* | (2006.01) |
| *G06F 3/0481* | (2013.01) |
| *G06F 3/0482* | (2013.01) |
| *G06F 3/0484* | (2013.01) |

(52) U.S. Cl.
CPC ....... *H04N 1/00411* (2013.01); *G06F 3/0481* (2013.01); *G06F 3/0482* (2013.01); *G06F 3/1207* (2013.01); *G06F 3/1259* (2013.01); *H04N 1/00403* (2013.01); *H04N 1/4433* (2013.01); *G06F 3/04845* (2013.01); *G06F 3/1287* (2013.01)

(58) Field of Classification Search
CPC ............ H04N 1/00411; H04N 1/4433; H04N 1/00403; G06F 3/1207; G06F 3/1259; G06F 3/04845; G06F 3/1287

USPC ....................................................... 358/1.13
See application file for complete search history.

(56) References Cited

U.S. PATENT DOCUMENTS

| 9,961,233 | B2 * | 5/2018 | Mizuno | .................. G06F 21/45 |
|---|---|---|---|---|
| 2011/0002003 | A1 * | 1/2011 | Suwabe | ................ G06F 21/629 |
| | | | | 358/1.14 |
| 2012/0057205 | A1 * | 3/2012 | Tashiro | .............. G03G 15/5016 |
| | | | | 358/1.15 |

(Continued)

FOREIGN PATENT DOCUMENTS

JP 2016218706 A 12/2016

OTHER PUBLICATIONS

JP 2016-218706; Naoki Chiyo; Dec. 22, 2016; Ricoh Co. LTD (English Translation) (Year: 2016).*

*Primary Examiner* — Neil R McLean
(74) *Attorney, Agent, or Firm* — Canon U.S.A., Inc. IP Division

(57) ABSTRACT

An image processing apparatus includes a registration unit configured to register content to be displayed, a reception unit configured to receive an event, a display control unit configured to, according to a specific event being received by the reception unit, display the content registered by the registration unit on an operation unit, and a determination unit configured to determine whether a function concerning accessibility is being activated, wherein, if it is determined that the function concerning accessibility is being activated, even when the specific event is received by the reception unit, the display control unit performs control not to display the content on the operation unit.

17 Claims, 37 Drawing Sheets

(56) References Cited

U.S. PATENT DOCUMENTS

2015/0103029 A1\* 4/2015 Mizoue ................. G06F 3/0484
                                                    345/173
2018/0197157 A1\* 7/2018 Magee .................. G06F 3/1423
2018/0239583 A1\* 8/2018 Castells De Monet .......................
                                                    G06F 3/1204

\* cited by examiner

FIG.5A

LOGIN

USER NAME: Admin
PASSWORD: •••••
LOGIN DESTINATION: THIS DEVICE ▽

Please enter your user name and password, specify a login destination, and click [LOGIN].

[ LOGIN ]

FIG.5B

SETTING/REGISTRATION     TO PORTAL   LOGGED-IN USER: Admin   LOGOUT

ENVIRONMENTAL SETTING
  PAPER SETTING
  TIMER/ELECTRIC POWER SETTING
  NETWORK
  EXTERNAL INTERFACE
  VOLUME ADJUSTMENT
ADJUSTMENT/MAINTENANCE
  IMAGE QUALITY ADJUSTMENT
FUNCTION SETTING
  COMMON
  COPY
  PRINTER
  FILE RETENTION/USE
MANAGEMENT SETTING
  USER MANAGEMENT
  DEVICE MANAGEMENT
  LICENSE/OTHERS
  DATA MANAGEMENT
  SECURITY SETTING

SETTING/REGISTRATION: ENVIRONMENTAL SETTING: PAPER SETTING
ENVIRONMENTAL SETTING: PAPER SETTING
  SETTING OF PAPER
  MANAGEMENT SETTING OF PAPER TYPE

| SETTING/REGISTRATION | TO PORTAL  LOGGED-IN USER: Admin  LOGOUT |
|---|---|
| ENVIRONMENTAL SETTING<br>  PAPER SETTING<br>  TIMER/ELECTRIC POWER SETTING<br>  NETWORK<br>  EXTERNAL INTERFACE<br>  VOLUME ADJUSTMENT<br>ADJUSTMENT/MAINTENANCE<br>  IMAGE QUALITY ADJUSTMENT<br>FUNCTION SETTING<br>  COMMON<br>  COPY<br>  PRINTER<br>  FILE RETENTION/USE<br>MANAGEMENT SETTING<br>  USER MANAGEMENT<br>  DEVICE MANAGEMENT<br>  LICENSE/OTHERS<br>  DATA MANAGEMENT<br>  SECURITY SETTING | SETTING/REGISTRATION: MANAGEMENT SETTING: LICENSE/OTHERS<br>MANAGEMENT SETTING: LICENSE/OTHERS<br><br>  MESSAGE BOARD/SUPPORT LINK<br>  SIGNAGE ~502<br>  REMOTE UI SETTING<br>  REGISTRATION/UPDATING OF SOFTWARE |

FIG.5D

| SETTINGS/REGISTRATION | TO PORTAL  LOGGED-IN USER: guest  LOGOUT |
|---|---|
| ENVIRONMENTAL SETTING<br>  PAPER SETTING<br>  TIMER/ELECTRIC POWER SETTING<br>  NETWORK<br>  VOLUME ADJUSTMENT<br>ADJUSTMENT/MAINTENANCE<br>  IMAGE QUALITY ADJUSTMENT<br>FUNCTION SETTING<br>  COMMON<br>  PRINTER<br>  FILE RETENTION/USE<br>MANAGEMENT SETTING<br>  USER MANAGEMENT<br>  DEVICE MANAGEMENT | SETTING/REGISTRATION: ENVIRONMENTAL SETTING: PAPER SETTING<br>ENVIRONMENTAL SETTING: PAPER SETTING<br><br>  SETTING OF PAPER<br>  MANAGEMENT SETTING OF PAPER TYPE |

FIG.6

| key | value |
|---|---|
| signage_settings.signage_disp | 1 |
| signage_settings.signage_protocol | 1 |
| signage_settings.signage_smb_adrs | \\guest_smb\share\image.jpg |
| signage_settings.signage_smb_user | guest |
| signage_settings.signage_smb_passwd | guest |
| signage_settings.signage_webdav_adrs | https://guest_webdav/signage.html |
| signage_settings.signage_webdav_user | user |
| signage_settings.signage_webdav_passwd | user |
| signage_settings.signage_webdav_cert | 1 |
| signage_settings.signage_webdav_cert_cn | 1 |

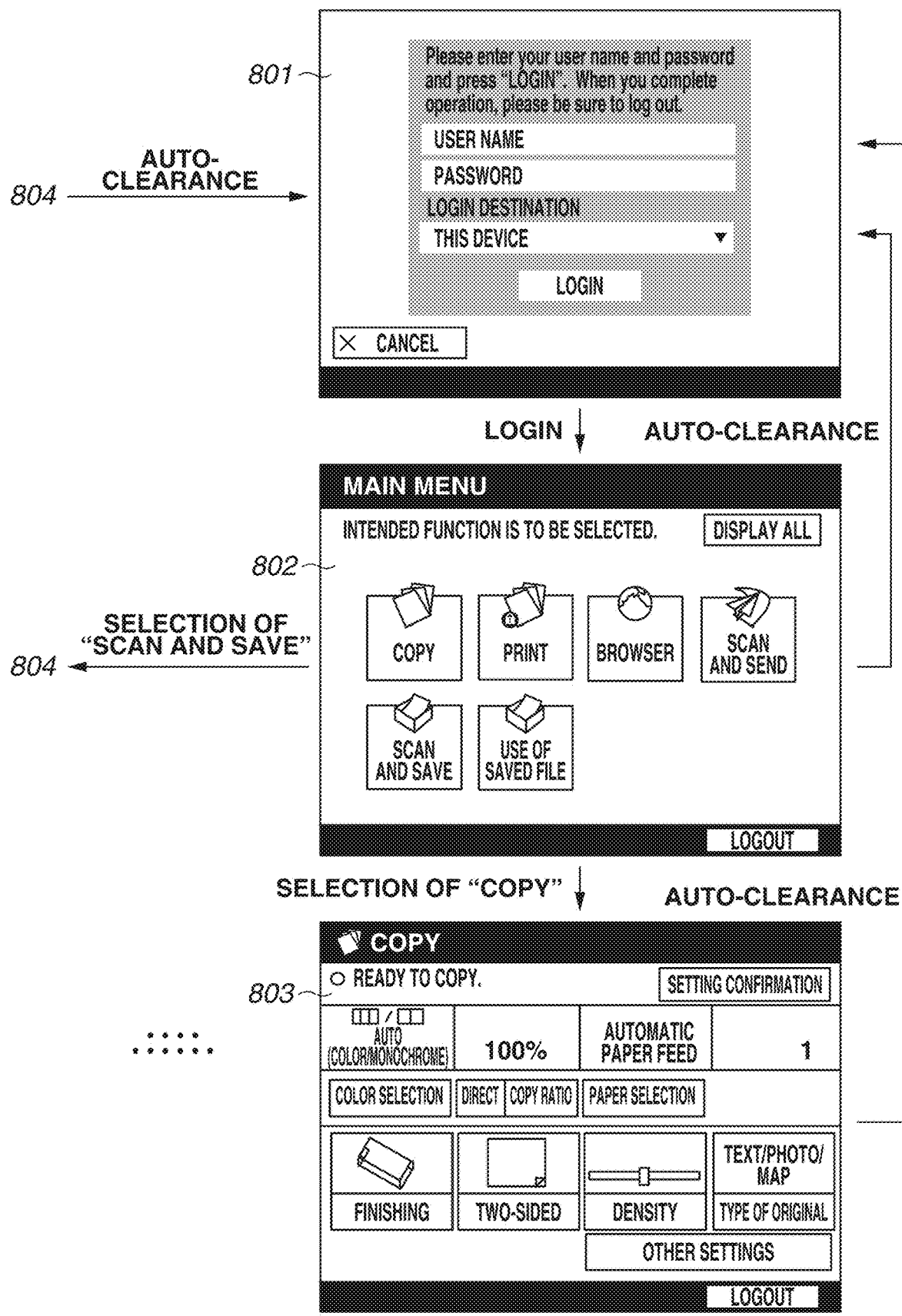

FIG.8A2
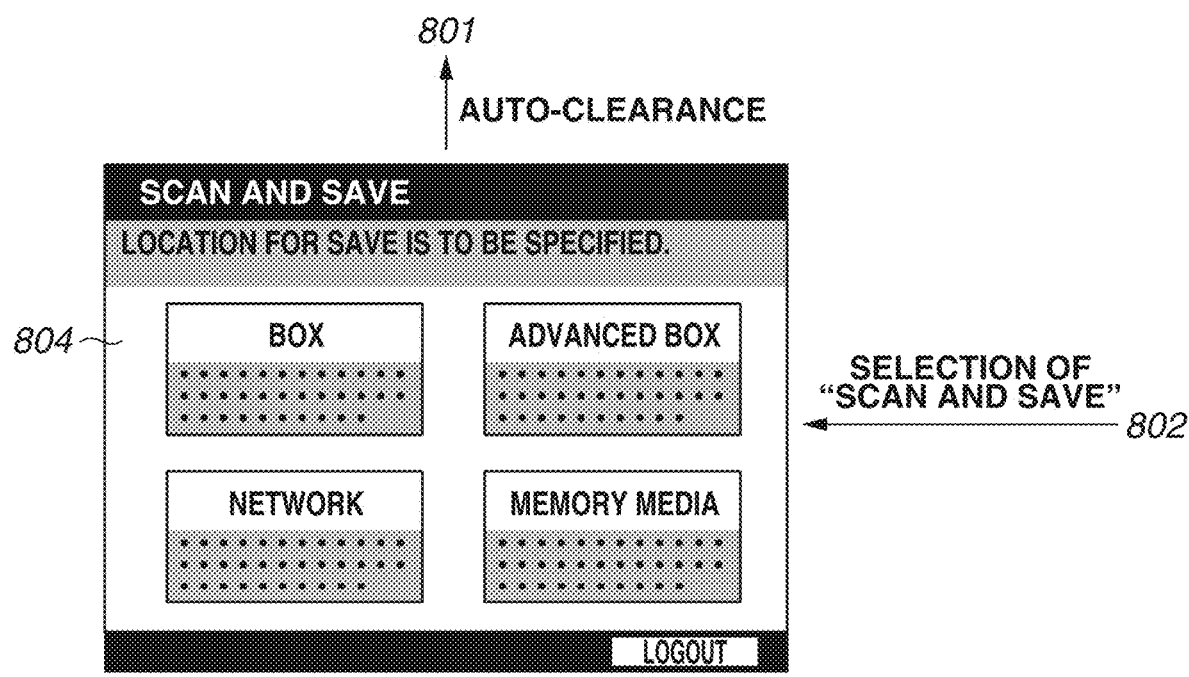

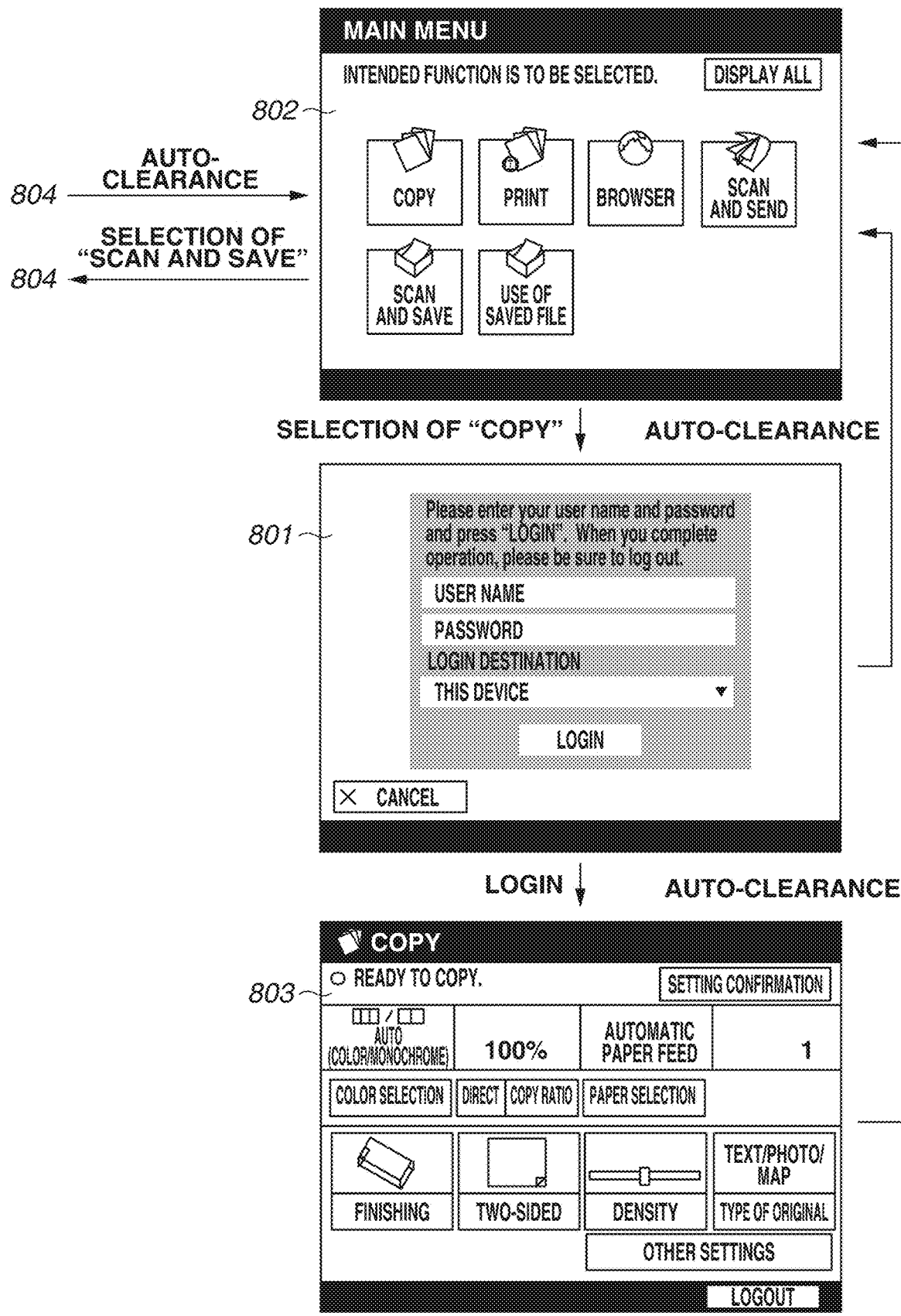
FIG.8B1

FIG.8B2
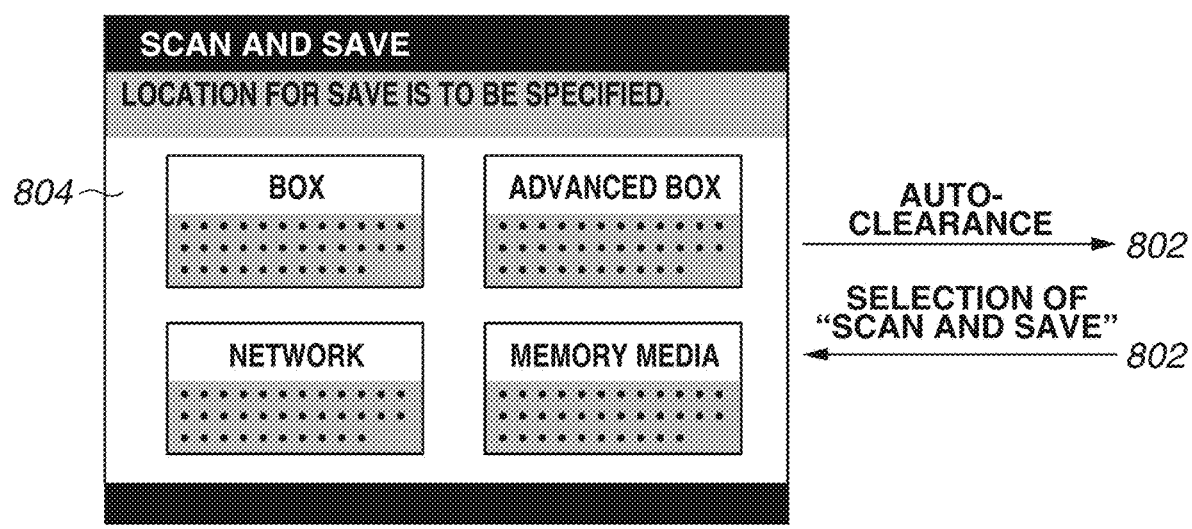

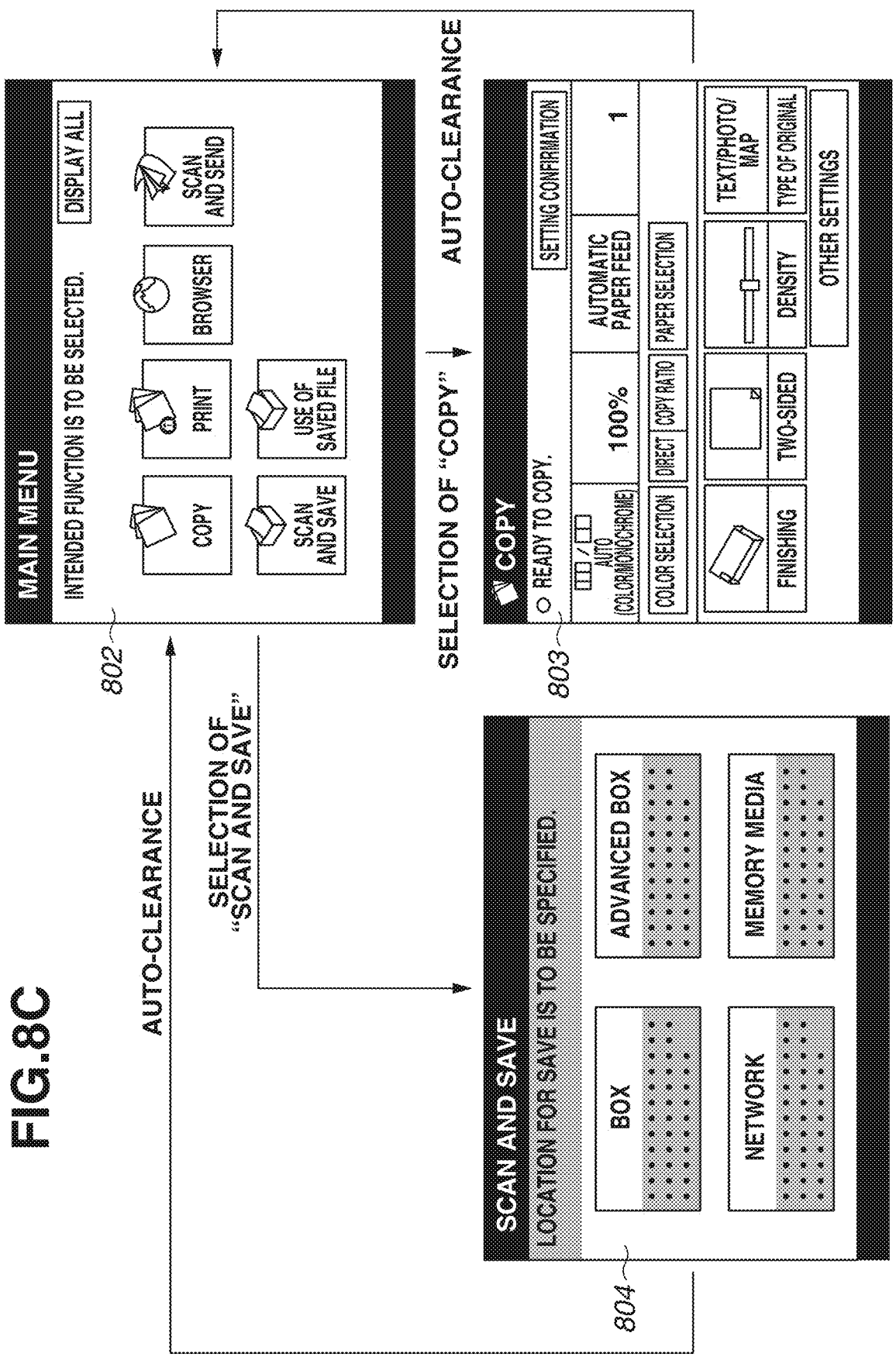

FIG.10A1
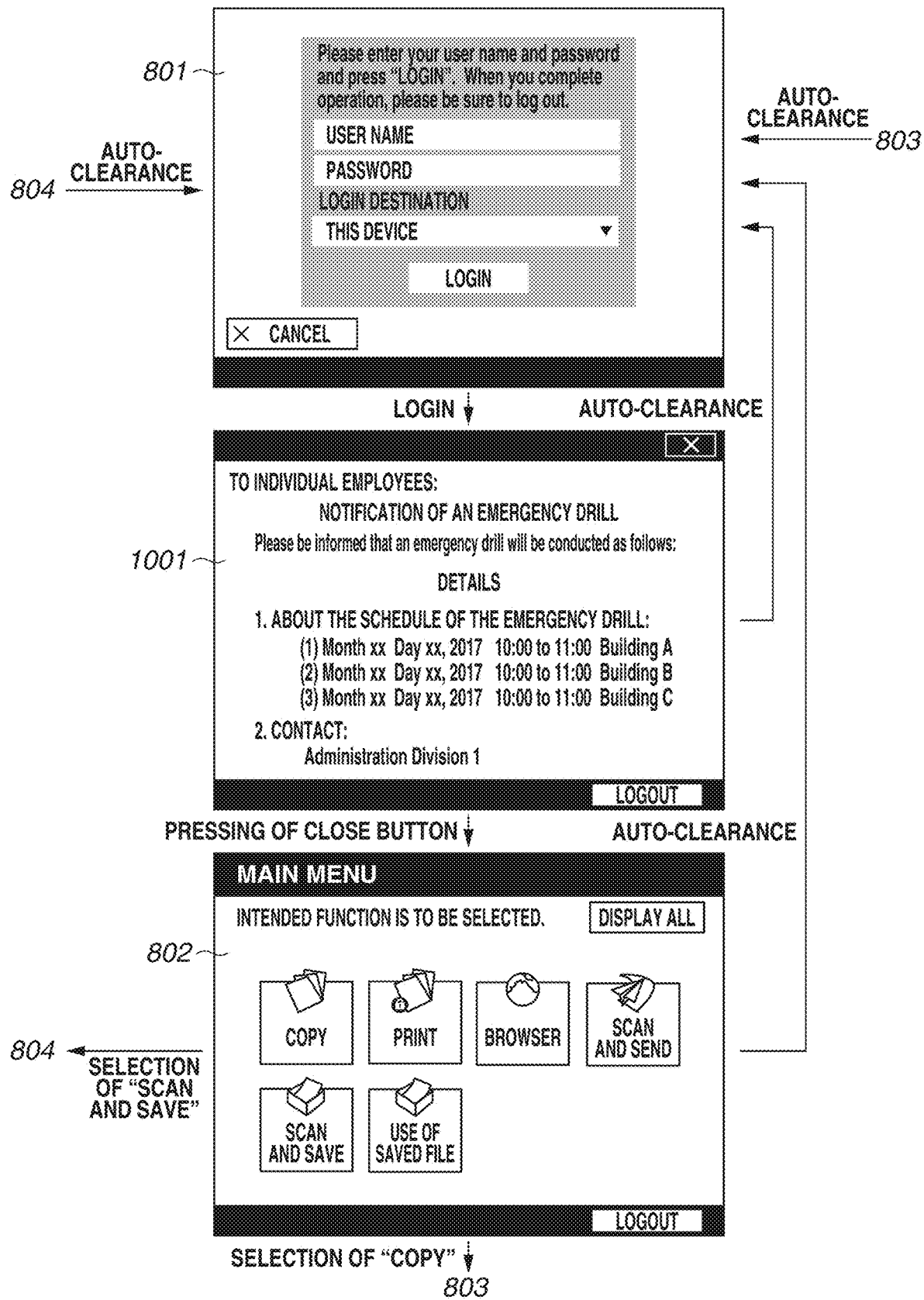

FIG.10A2
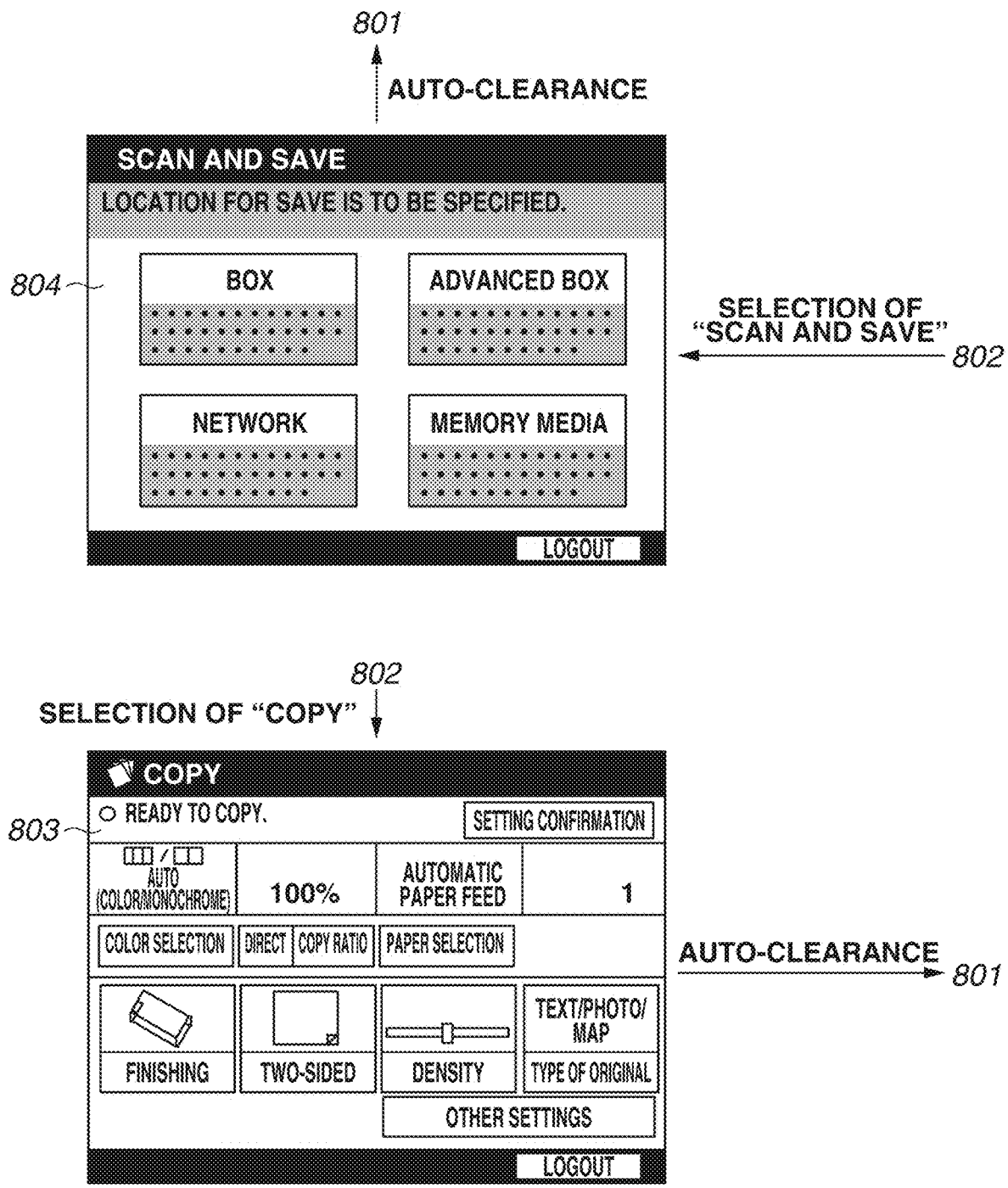

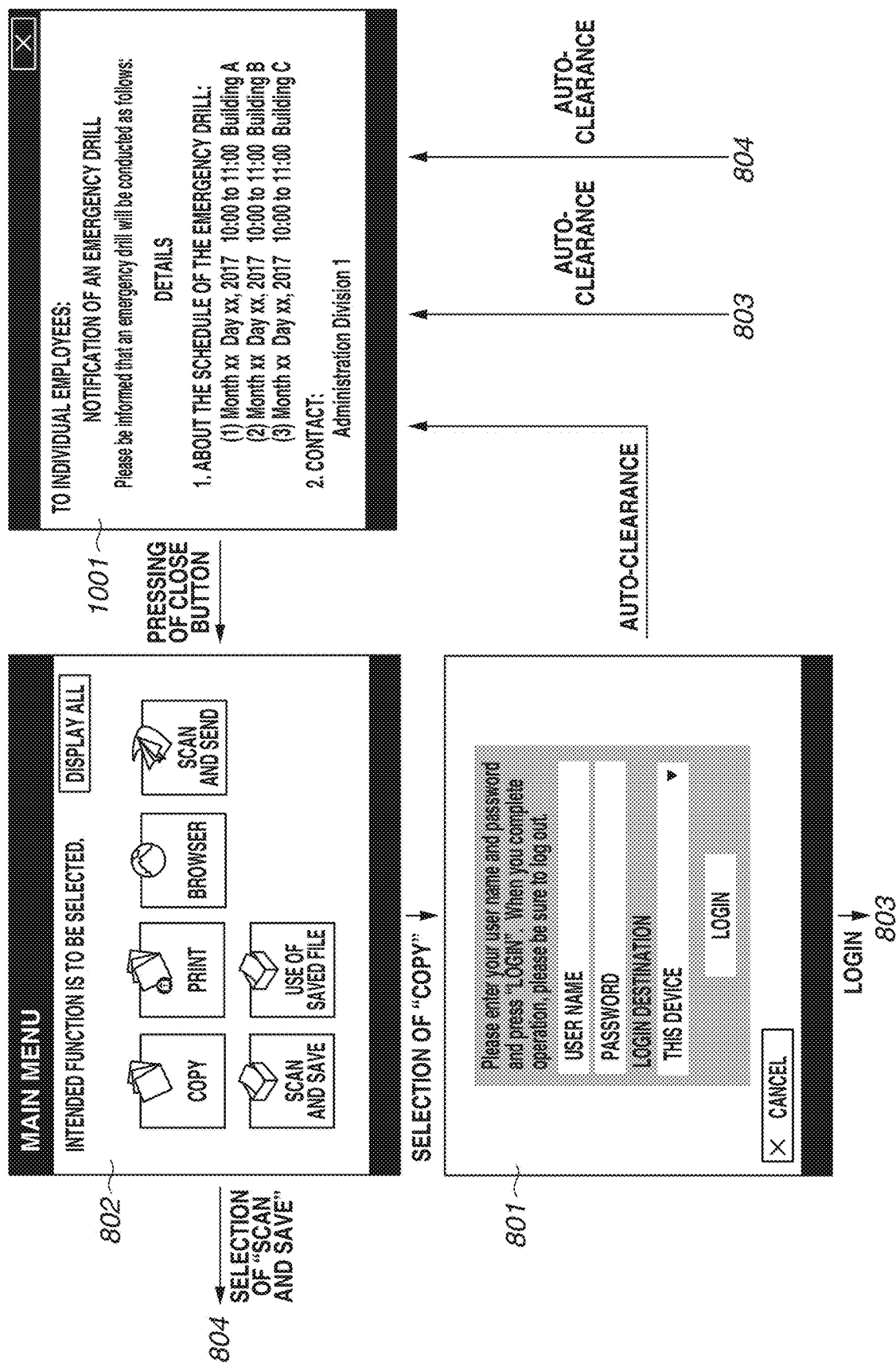

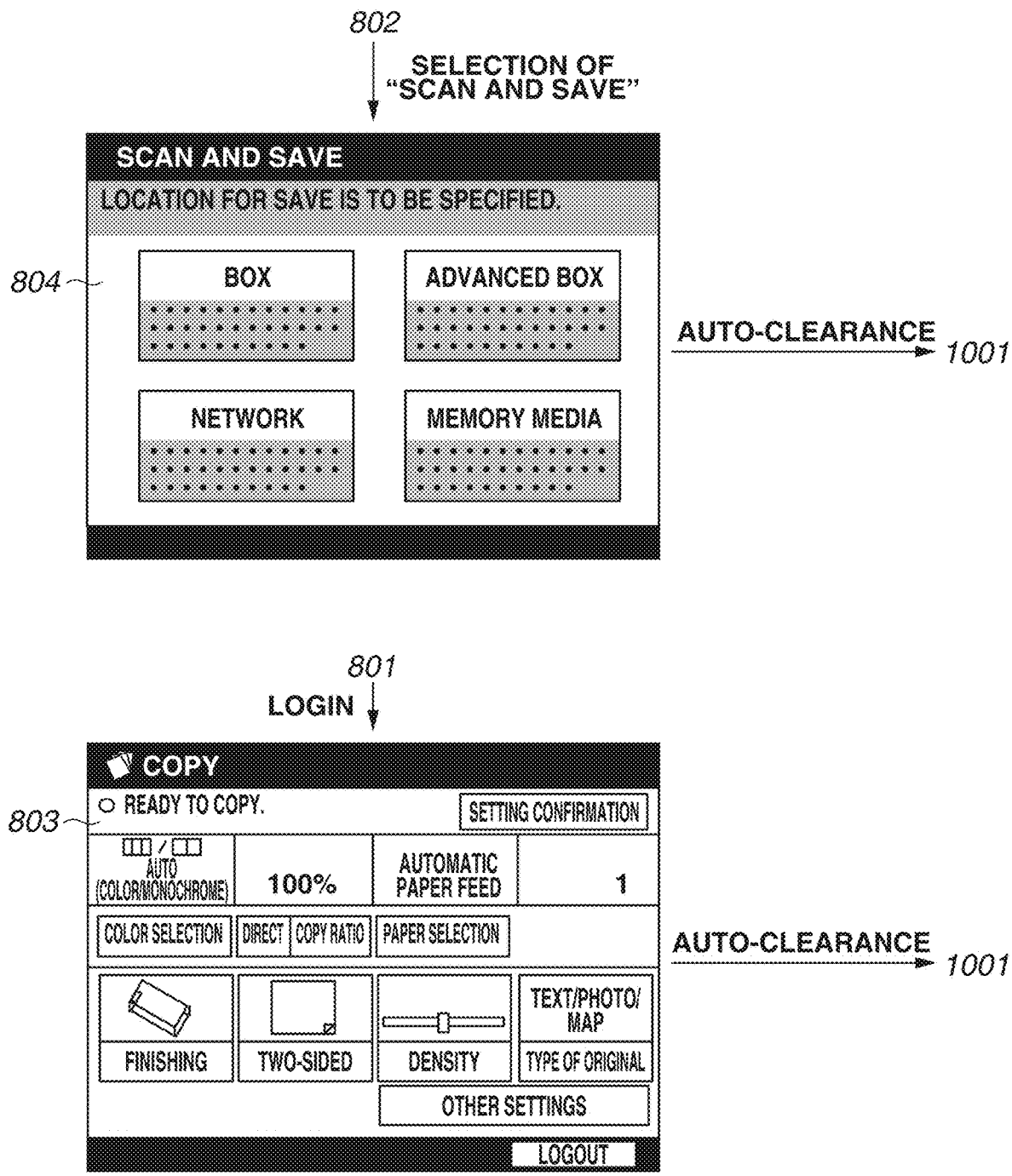
FIG.10B2

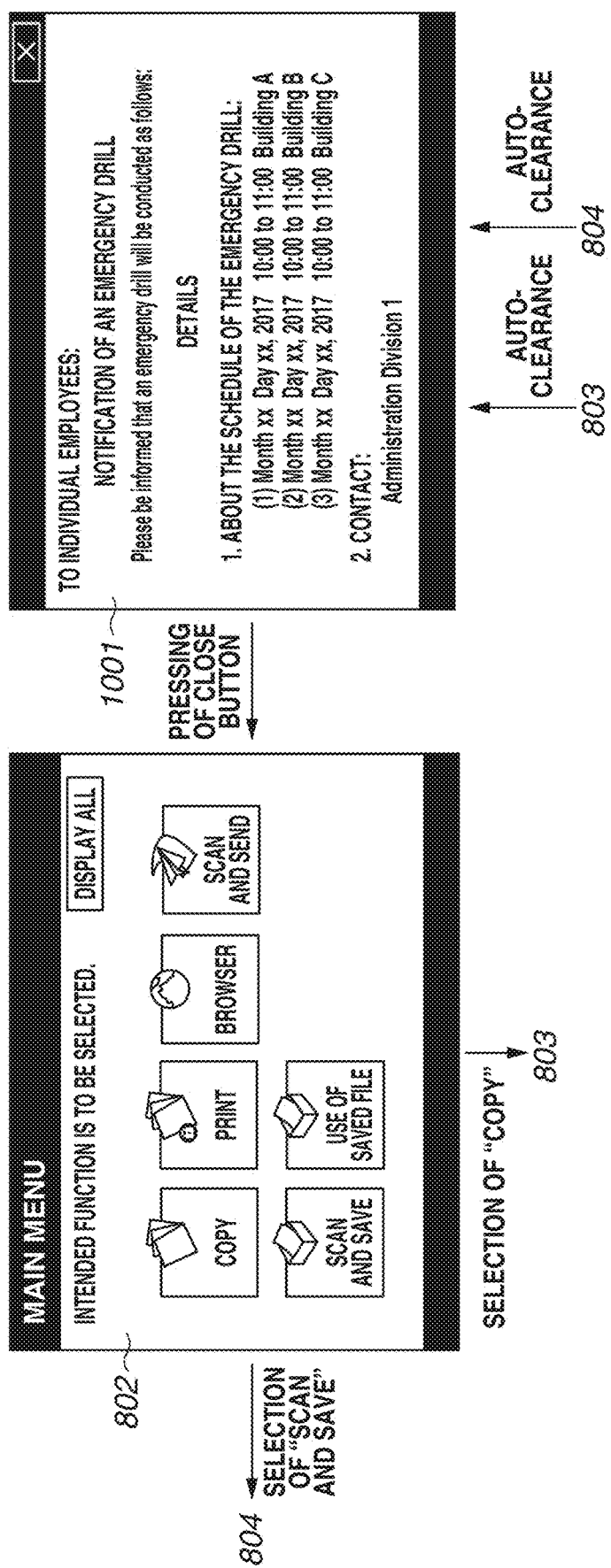

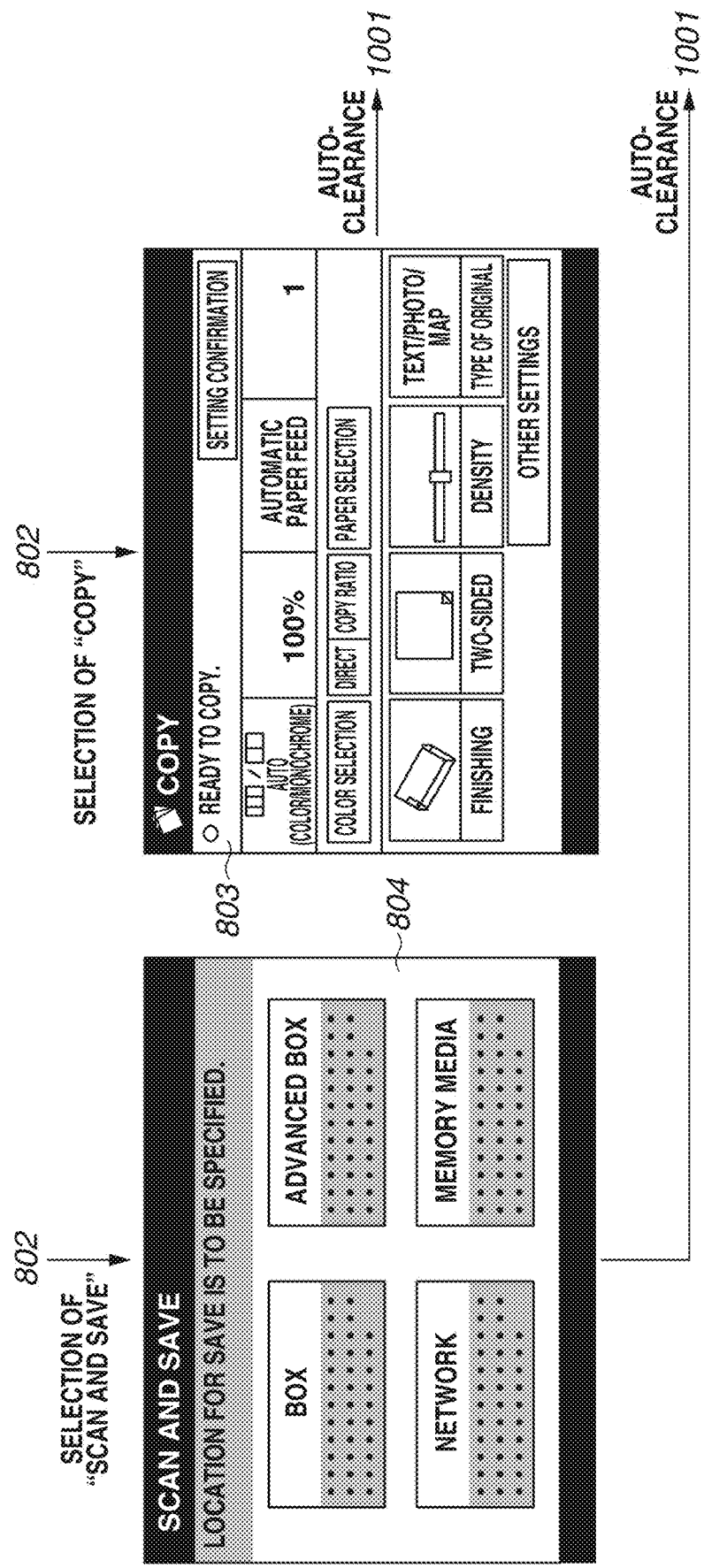

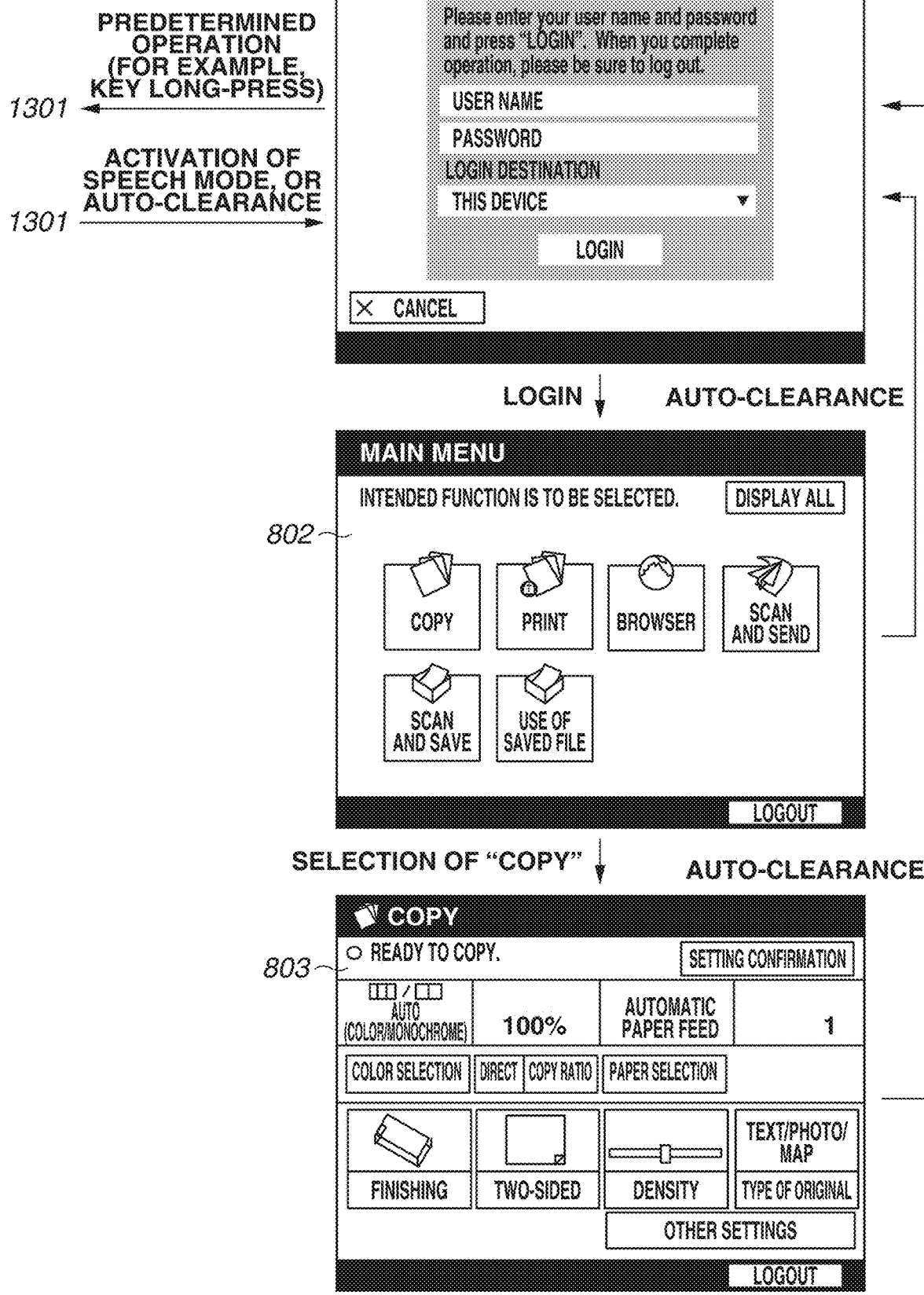

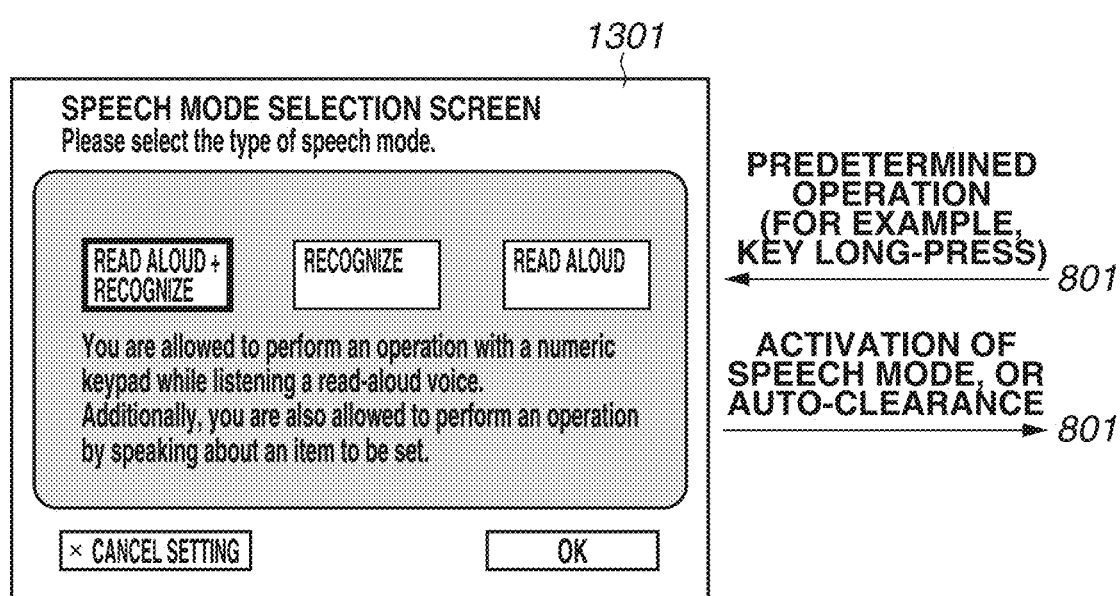
FIG.12A2

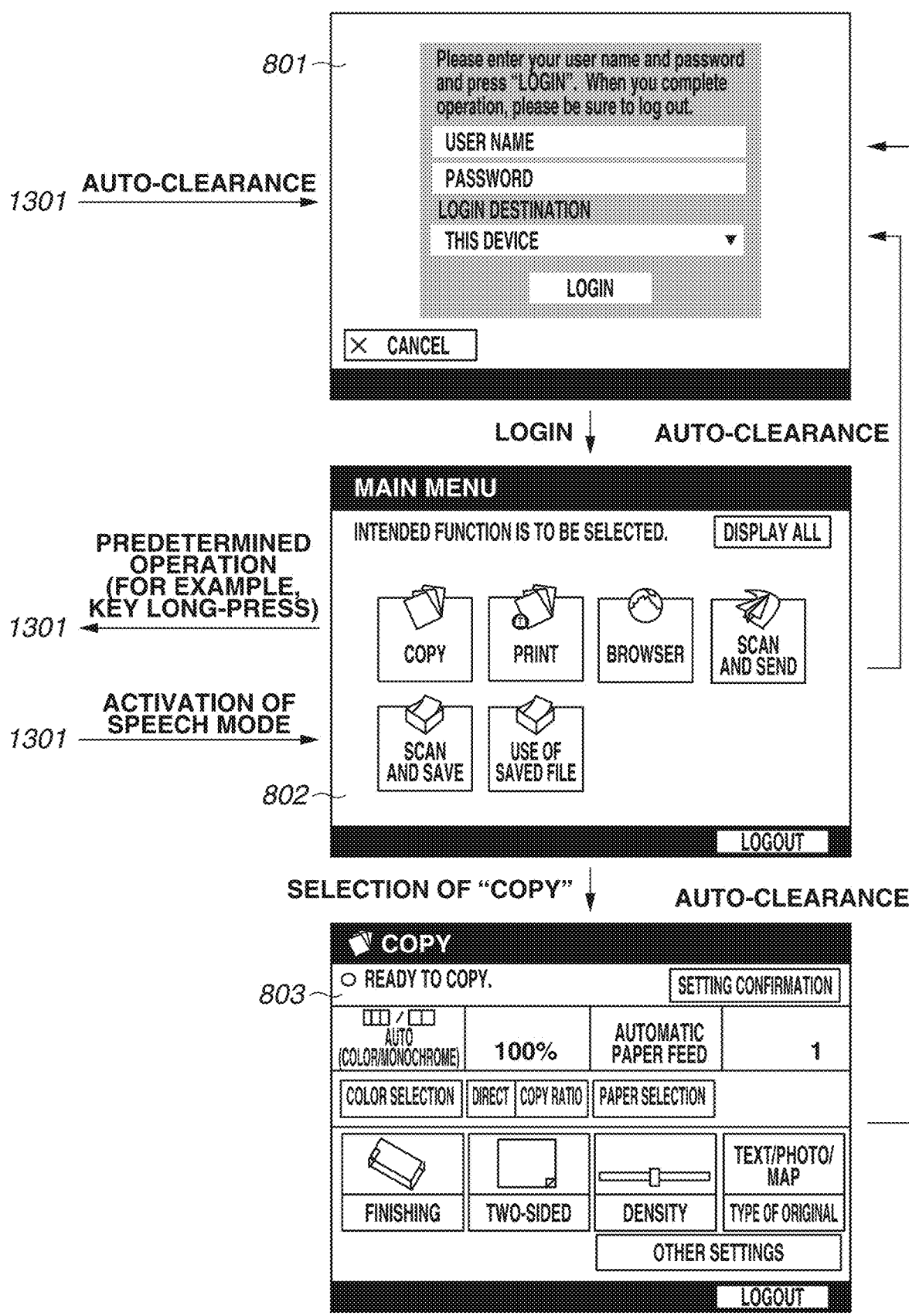
FIG.12B1

FIG.12B2
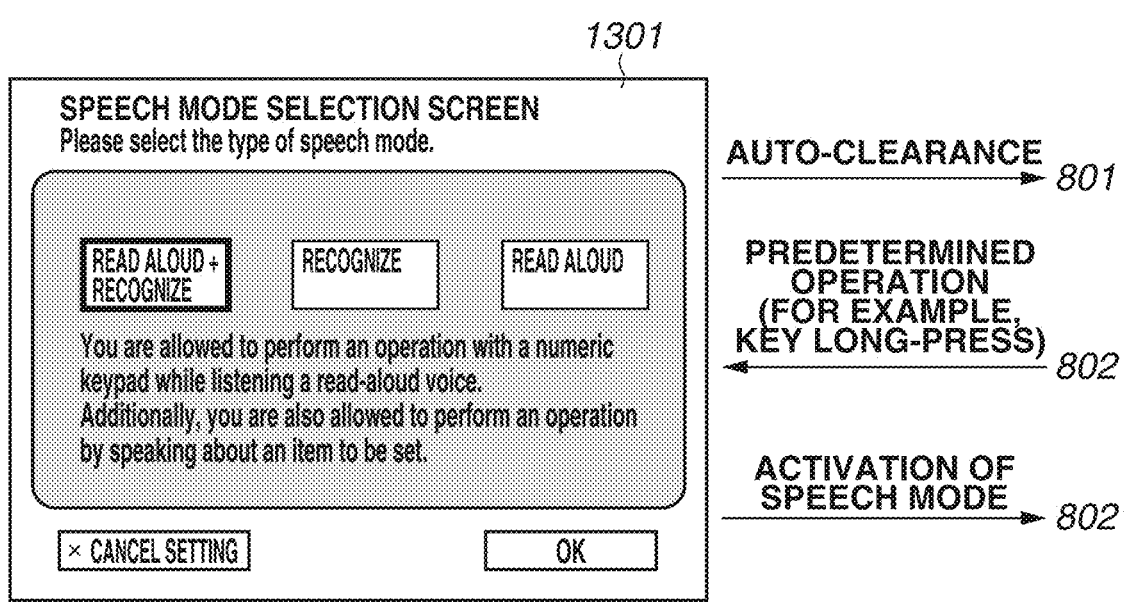

FIG.13A1
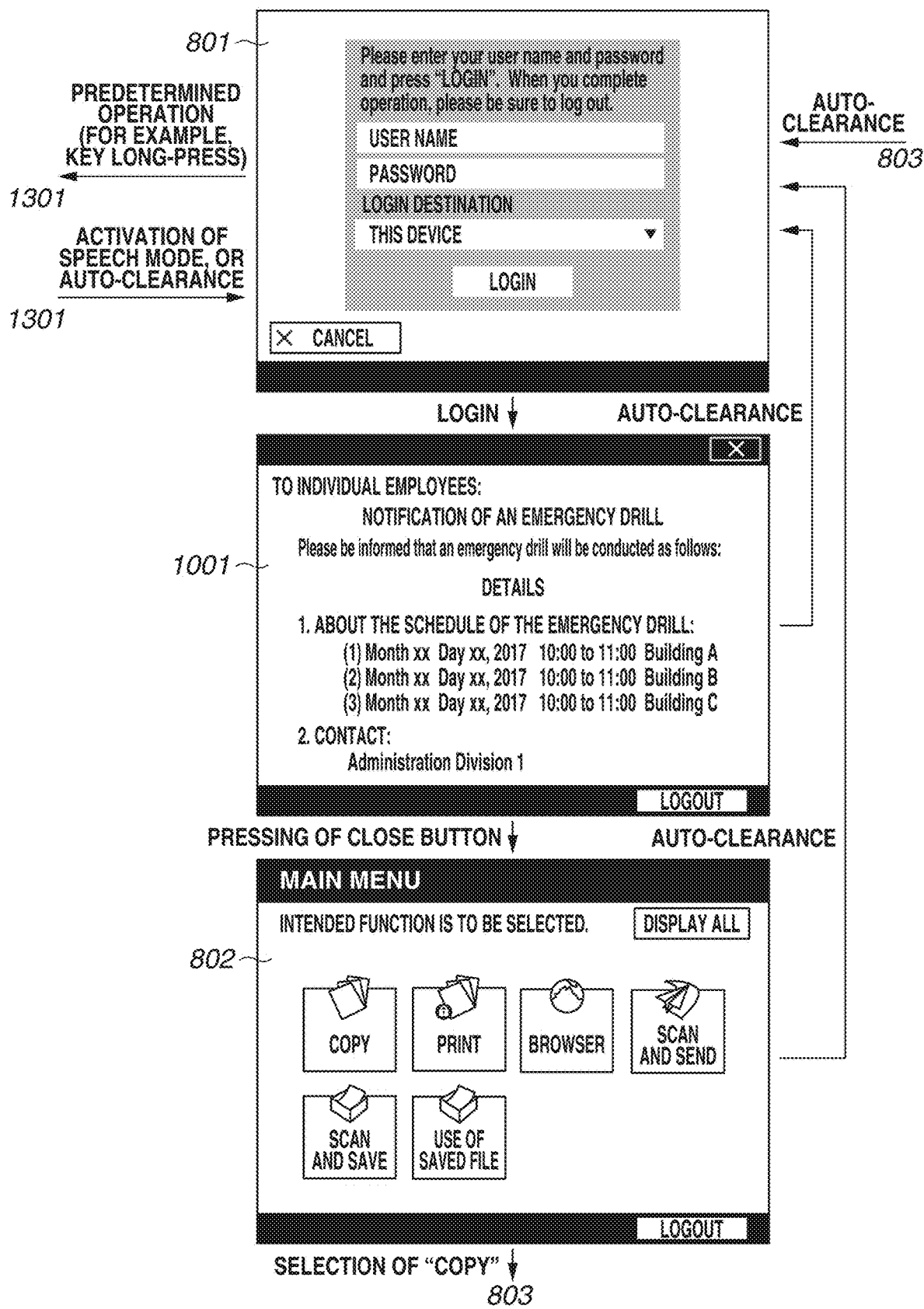

FIG.13A2
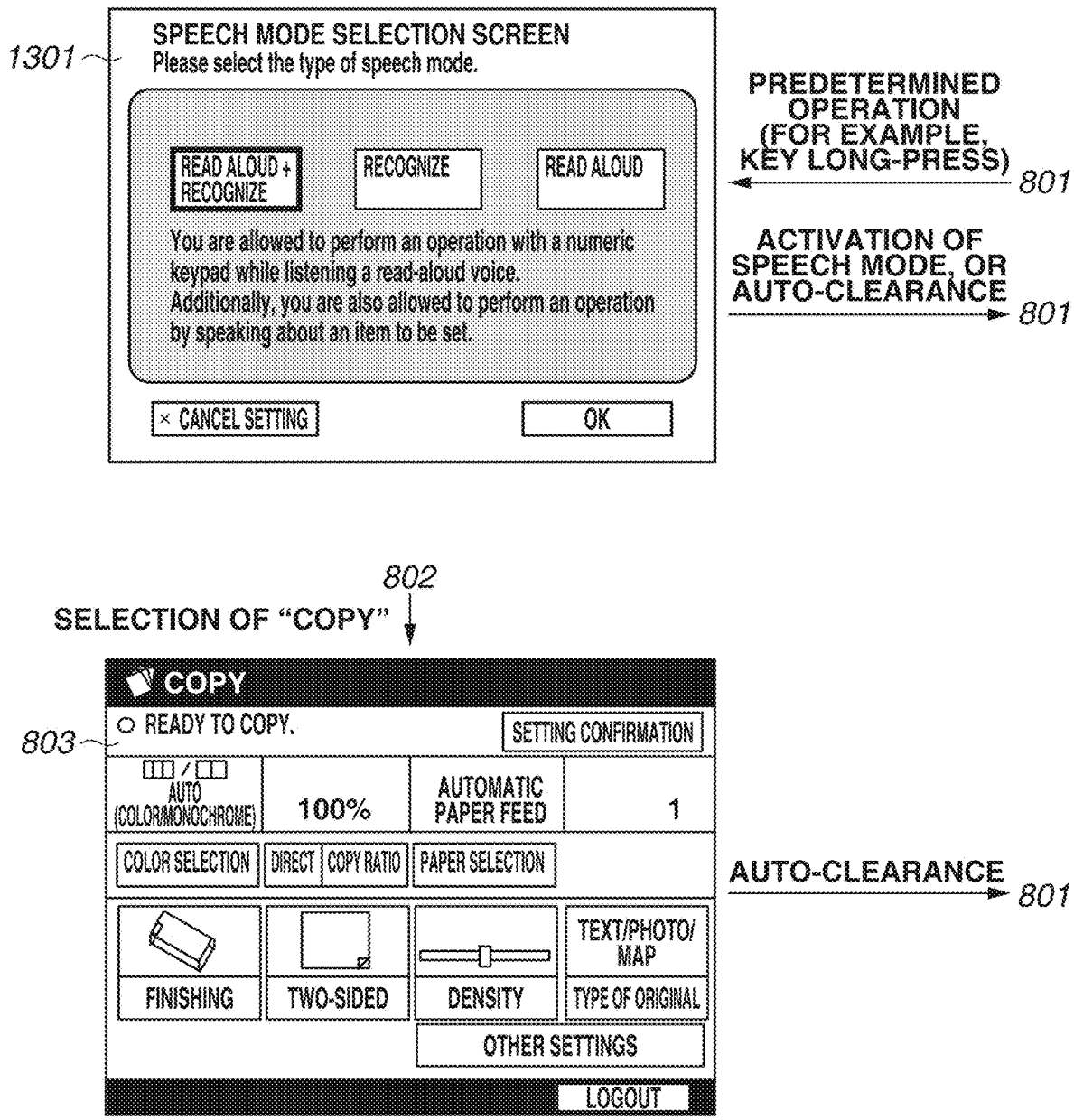

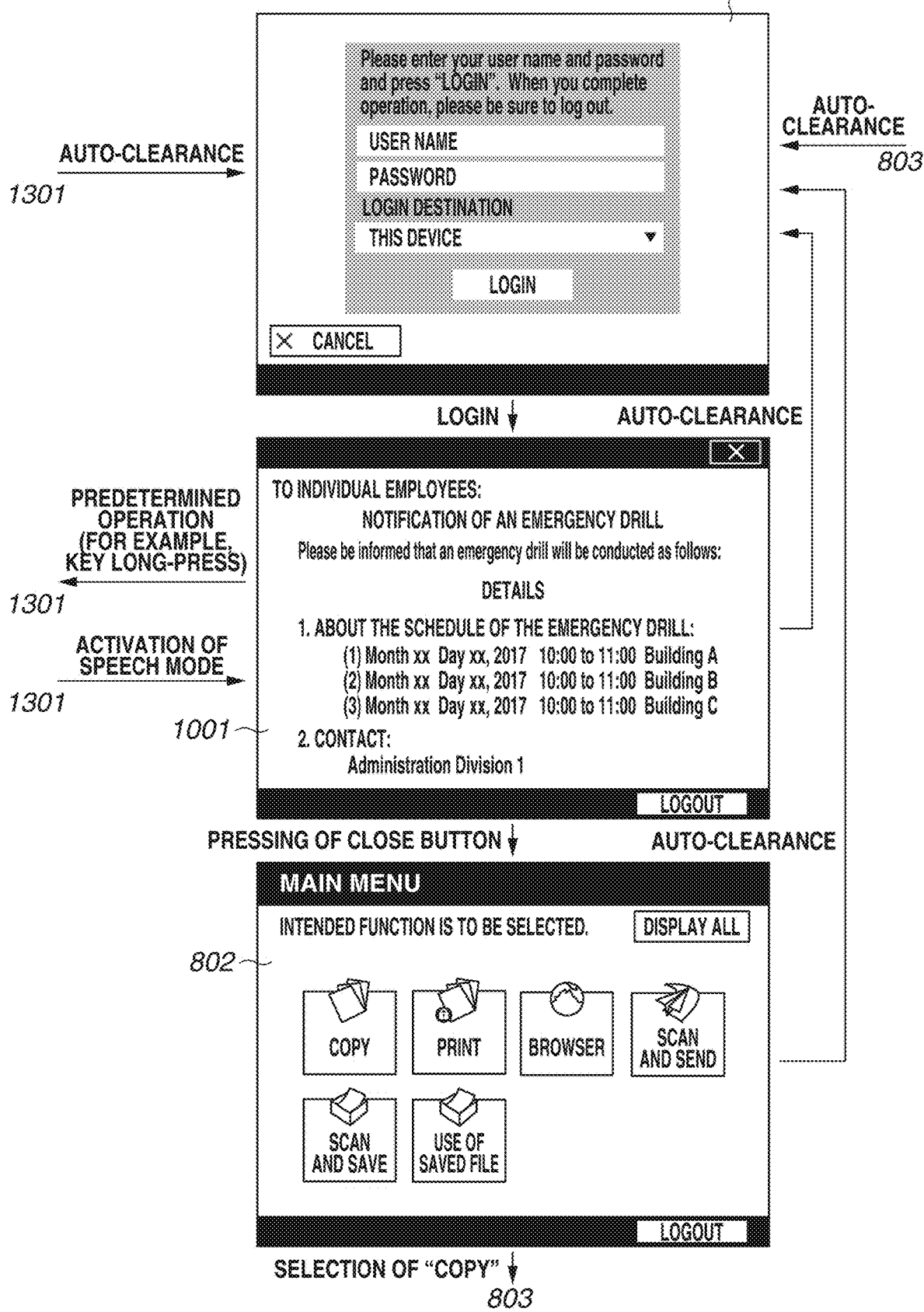
FIG.13B1

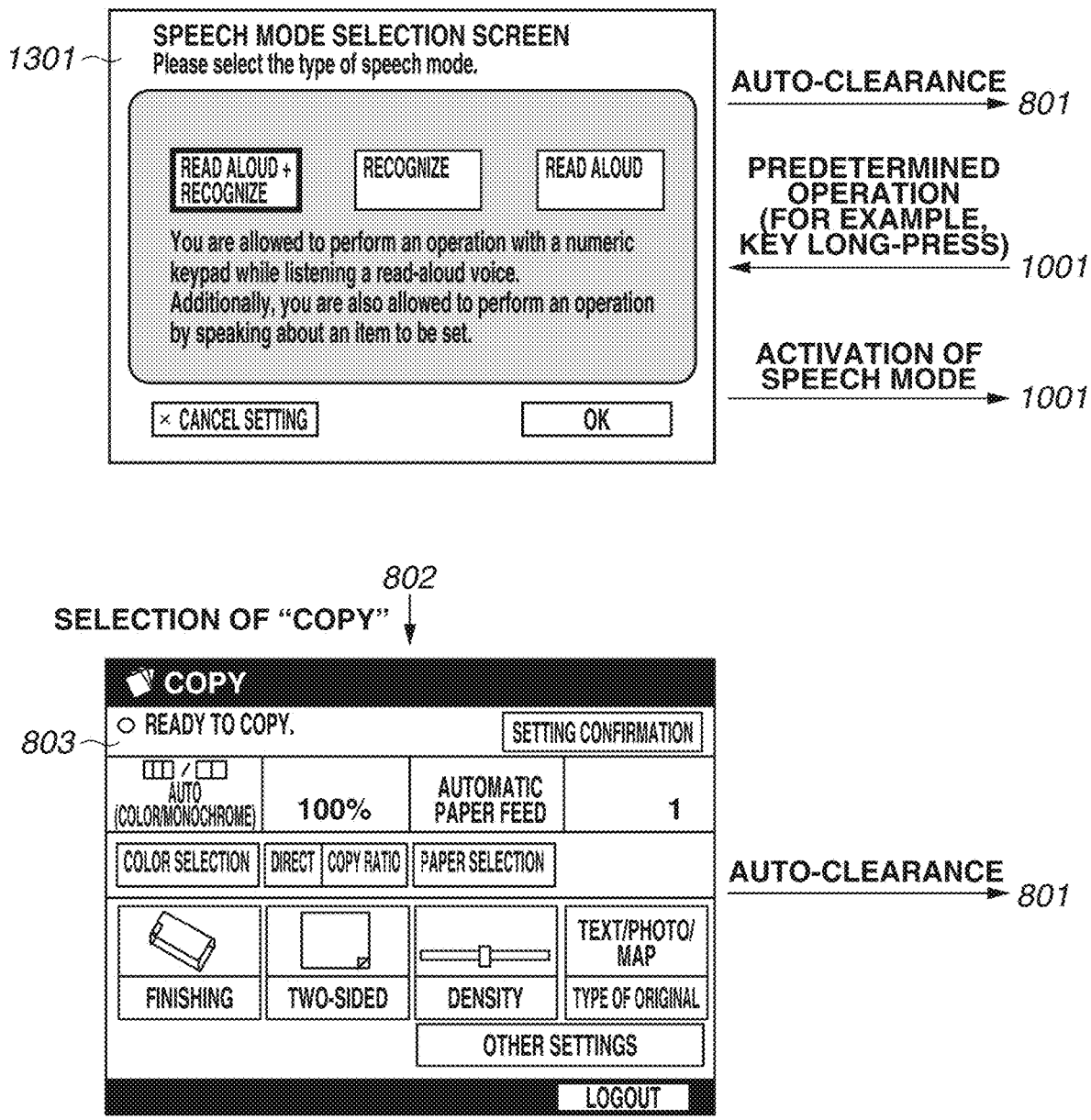
FIG.13B2

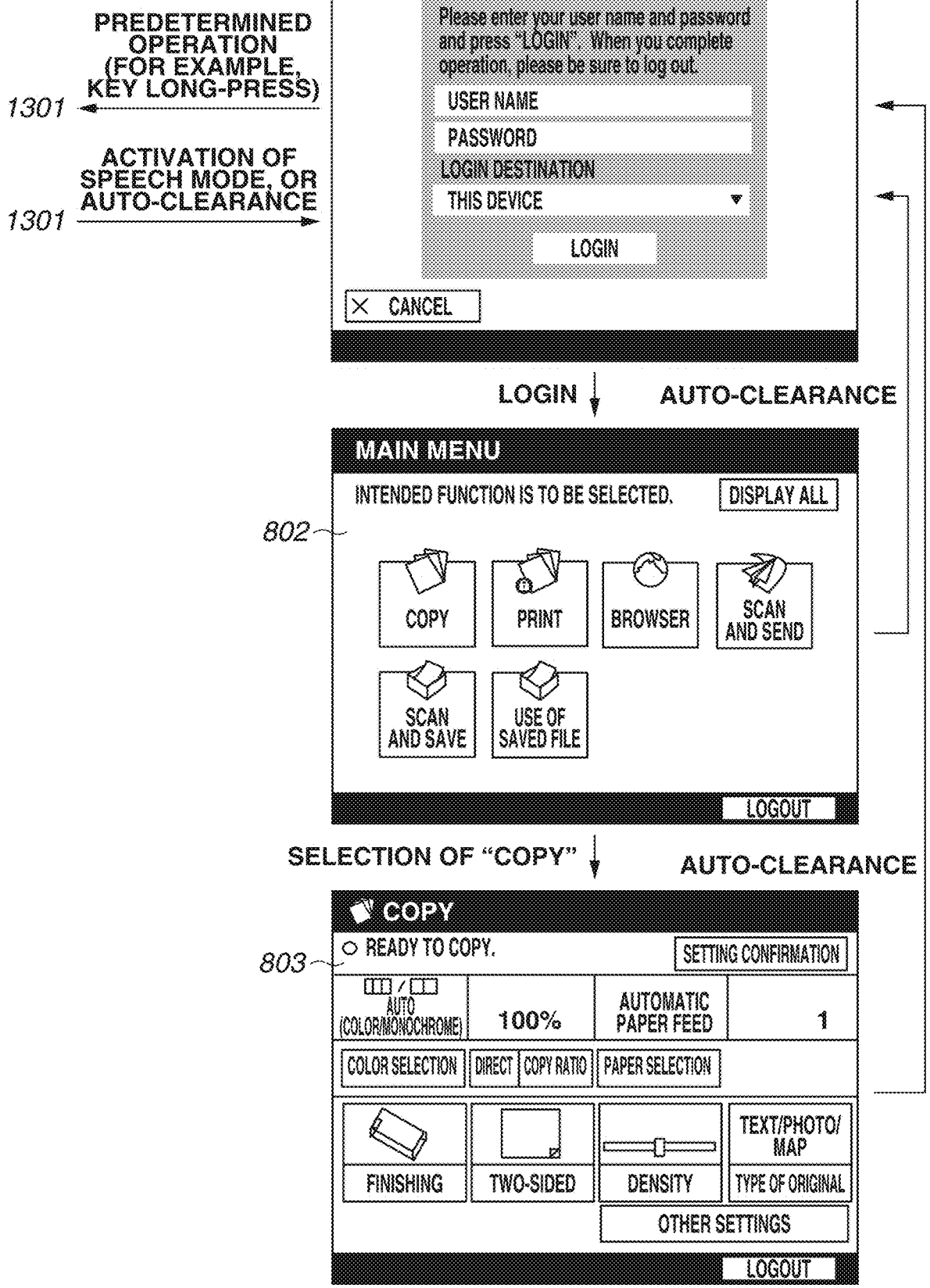

FIG.14A2
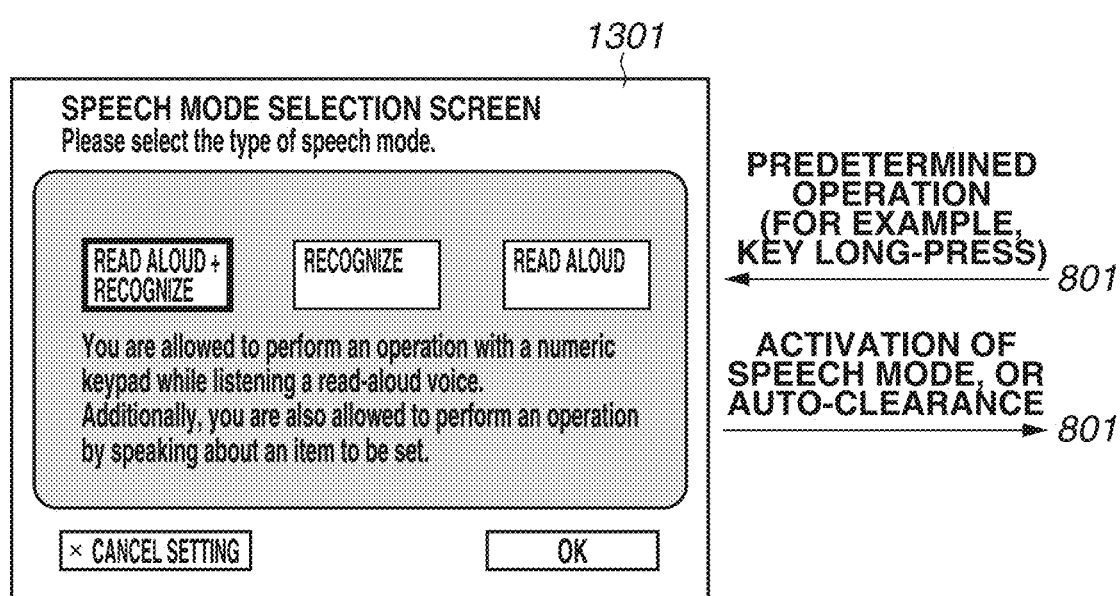

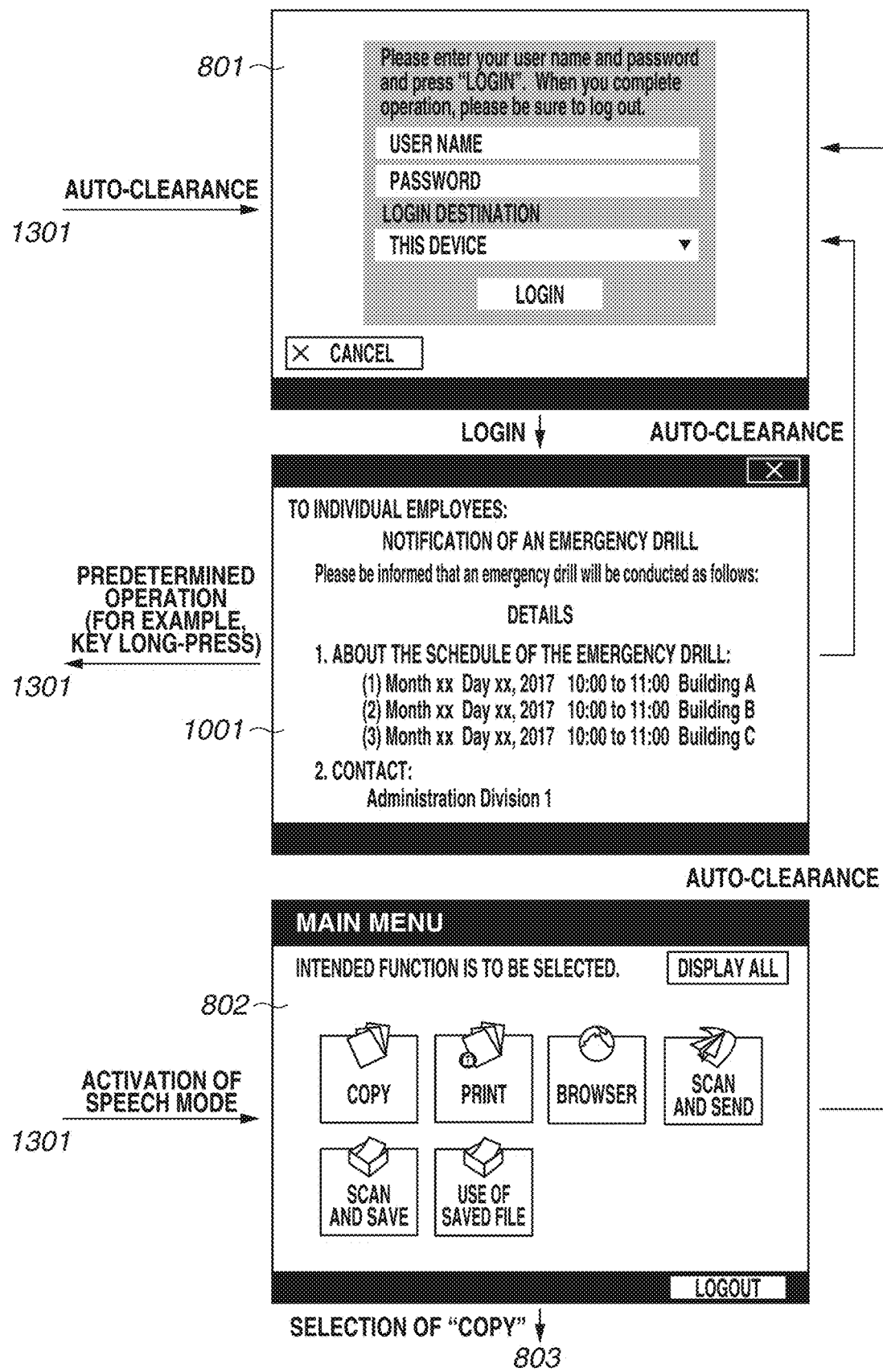

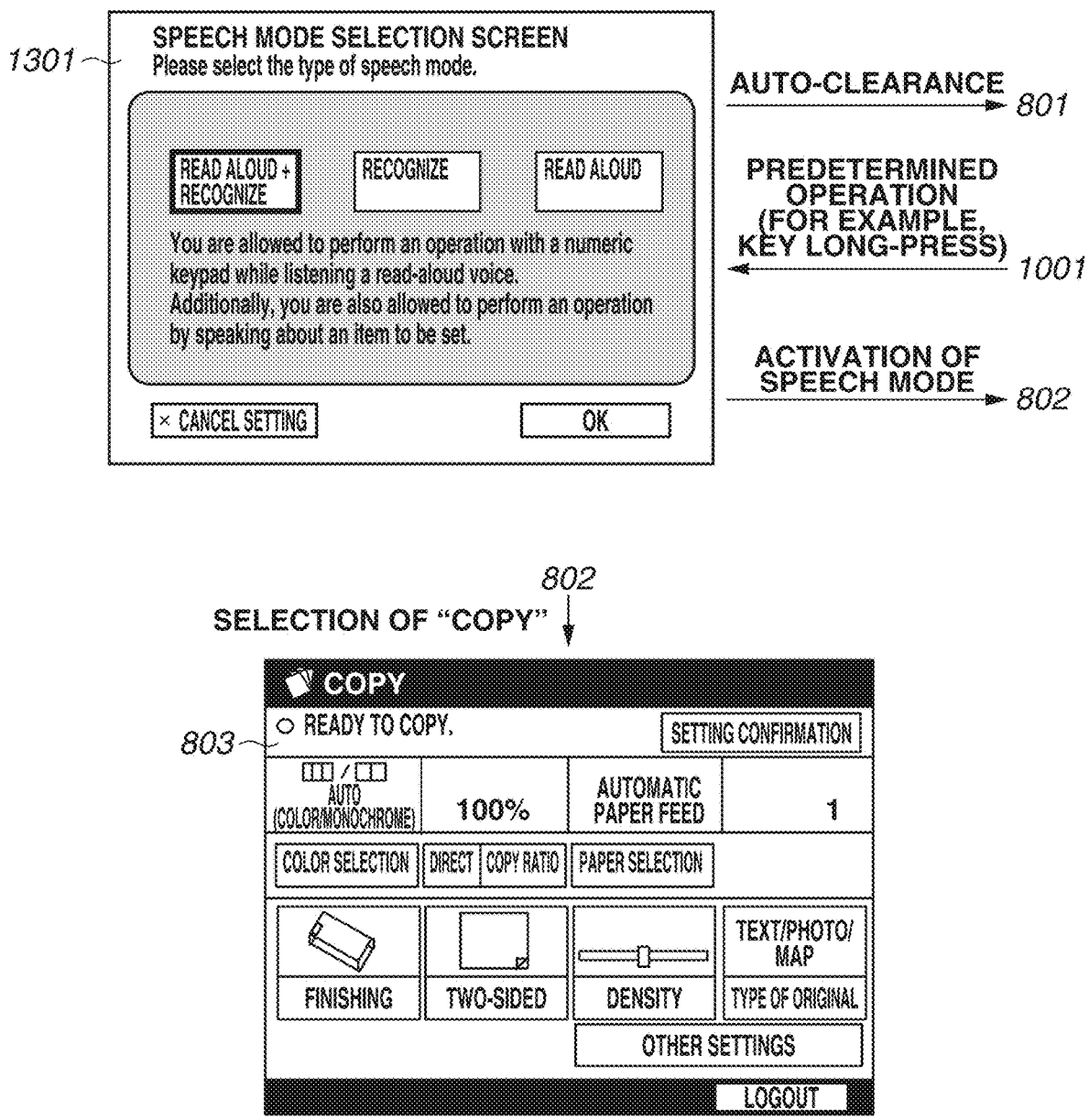
FIG.14B2

IMAGE PROCESSING APPARATUS, CONTROL METHOD THEREFOR, AND STORAGE MEDIUM

BACKGROUND

Field of the Disclosure

Aspects of the present disclosure generally relate to an image processing apparatus, a control method therefor, and a storage medium.

Description of the Related Art

In recent years, "digital signage", which offers information via, for example, a display connected to a network, has been becoming widespread in all sorts of places, such as the outdoors, a store front, a public space, and a transportation facility. Even in offices of, for example, companies, utilization of digital signage is attracting attention with a view to, for example, supporting sharing of information for employees or performing information control for companies.

Even with regard to an image processing apparatus such as a multifunction peripheral, the technique of acquiring content from a content distribution apparatus connected to a network and displaying the acquired content on an operation unit of the image processing apparatus is known (Japanese Patent Application Laid-Open No. 2016-218706).

SUMMARY

According to an aspect of the present disclosure, an image processing apparatus includes a registration unit configured to register content to be displayed, a reception unit configured to receive an event, a display control unit configured to, according to a specific event being received by the reception unit, display the content registered by the registration unit on an operation unit, and a determination unit configured to determine whether a function concerning accessibility is being activated, wherein, if it is determined that the function concerning accessibility is being activated, even when the specific event is received by the reception unit, the display control unit performs control not to display the content on the operation unit.

Further features of the present invention will become apparent from the following description of exemplary embodiments with reference to the attached drawings.

BRIEF DESCRIPTION OF THE DRAWINGS

FIG. 5A, FIG. 5B, FIG. 5C, FIG. 5D, FIG. 5E, FIG. 5F, and FIG. 5G are diagrams illustrating screen examples of setting screens for content.

FIG. 6 is a diagram illustrating an example of a content setting management table.

FIGS. 8A1 and 8A2, FIGS. 8B1 and 8B2, and FIG. 8C are diagrams illustrating flows of screens which are displayed in a case where displaying of a signage application is OFF and setting for displaying an authentication screen at the start of operation is performed.

FIGS. 10A1 and 10A2, FIGS. 10B1 and 10B2, and FIGS. 10C1 and 10C2 are diagrams illustrating flows of screens which are displayed in a case where displaying of the signage application is ON and setting for displaying an authentication screen at the start of operation is performed.

FIGS. 12A1 and 12A2 and FIGS. 12B1 and 12B2 are diagrams illustrating flows of general screens which are displayed when the user, who uses the speech mode, operates the image processing apparatus.

FIGS. 13A1 and 13A2 and FIGS. 13B1 and 13B2 are diagrams illustrating flows of screens which are displayed in a case where setting is performed such that, when the speech mode is activated with screen displaying of the signage application in an ON state, a screen of the signage application is displayed.

FIGS. 14A1 and 14A2 and FIGS. 14B1 and 14B2 are diagrams illustrating flows of screens which are displayed in a case where the processing illustrated in FIG. 4 is performed when the speech mode is activated with screen displaying of the signage application in an ON state.

DESCRIPTION OF THE EMBODIMENTS

Various exemplary embodiments, features, and aspects of the disclosure will be described in detail below with reference to the drawings.

Image processing apparatuses are terminals which are used by a diversity of users, and there are also users who operate an image processing apparatus while utilizing a speech mode function or a screen magnification function included in the image processing apparatus. It is supposed that the users who utilize such an accessibility function are mostly persons who are completely blind or persons who are partially sighted. The signage function, which is a function to exhibit information, has only a small effect on persons who are completely blind or persons who are partially sighted, and cannot be said to be effective as an information communication method for such users. Moreover, the signage function produces a step of displaying a screen for exhibiting information to the user, and, therefore, would change an operation procedure of the image processing apparatus. Changing an operation procedure of the image processing apparatus becomes a factor for decreasing the operability of the image processing apparatus for users who utilize the accessibility function, particularly, persons who are completely blind.

The following exemplary embodiment is directed to providing an image processing apparatus capable of allowing users who do not utilize the accessibility function to enjoy the advantages of the signage function without decreasing the operability of users who utilize the accessibility function.

<Configurations of Image Processing System and Image Processing Apparatus 100>

Figure 1:
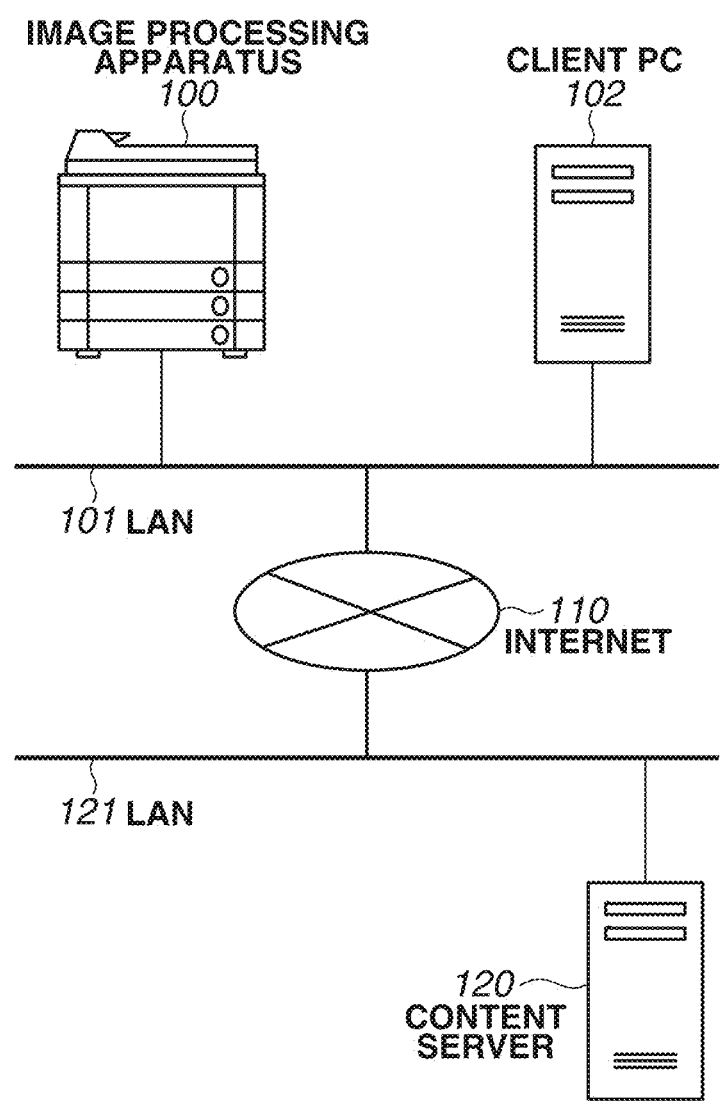
FIG. 1 is an overall view of a system.

FIG. 1 is an overall view of an image processing system according to an exemplary embodiment of the present disclosure. An image processing apparatus 100 is connected to the Internet 110 via a local area network (LAN) 101. A client personal computer (PC) 102 is connected to the image processing apparatus 100 via the LAN 101. A content server 120, which stores various pieces of content, is connected to the Internet 110 via a LAN 121. The image processing apparatus 100 is able to acquire content, which is described below, from the content server 120 via the Internet 110. Furthermore, while, in the present exemplary embodiment, an example in which one image processing apparatus 100, one client PC 102, and one content server 120 are included is described, a configuration in which more than one apparatus is included with regard to each of such apparatuses can be employed. Moreover, a configuration in which, instead of the content server 120, the image processing apparatus 100 can store content and internally acquire content to be displayed can also be employed.

Figure 2:
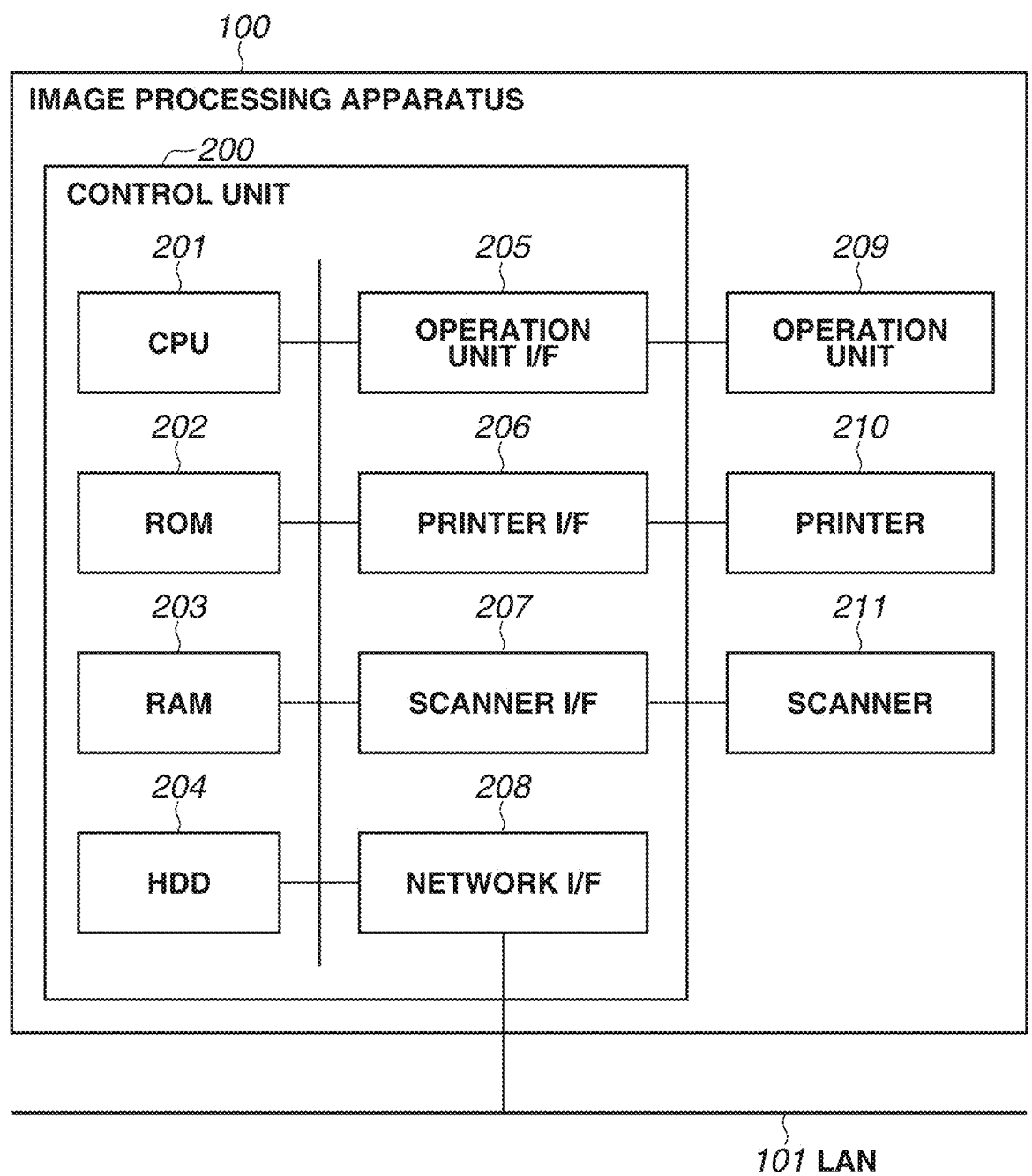
FIG. 2 is a block diagram illustrating a hardware configuration of an image processing apparatus.

FIG. 2 is a block diagram illustrating a configuration of the image processing apparatus 100 according to the present exemplary embodiment. A control unit 200, which includes a central processing unit (CPU) 201, controls an operation of the entire image processing apparatus 100. The CPU 201 reads out a control program stored in a read-only memory (ROM) 202 and performs various control operations, such as reading control and transmission control. The ROM 202, which is a boot ROM, stores a boot program for the system. A random access memory (RAM) 203 is used as a temporary storage region, such as a main memory and a work memory for the CPU 201. A hard disk drive (HDD) 204 stores image data, various programs, or various information tables. Moreover, the HDD 204 can store content, which is described below. An operation unit interface (I/F) 205 is an interface for connecting an operation unit 209 and the control unit 200. The operation unit 209 is provided with, for example, a liquid crystal display unit having a touch panel function and a keyboard.

A printer I/F 206 is an interface for connecting a printer 210 and the control unit 200. Image data to be printed by the printer 210 is transferred from the control unit 200 via the printer I/F 206, and is then printed on a recording medium (on a sheet of paper) by the printer 210.

A scanner I/F 207 is an interface for connecting a scanner 211 and the control unit 200. The scanner 211 reads an image on an original to generate image data, and inputs the image data to the control unit 200 via the scanner I/F 207.

A network I/F 208 is an interface for connecting the control unit 200 to the LAN 101. The network I/F 208 transmits and receives information to and from an external apparatus connected to the Internet 110 via the LAN 101.

Representative examples of the functions (applications) included in the image processing apparatus 100 include as follows:

a "copy" function, which prints, by the printer 210, image data generated by reading an image on an original with the scanner 211;

a "print" function, which prints, by the printer 210, image data based on a print job imported from an external such as the client PC 102;

a "scan and send" function, which sends, to an external via the network I/F 208, image data generated by reading an image on an original with the scanner 211;

a "scan and save" function, which saves, on the HDD 204, image data generated by reading an image on an original with the scanner 211;

a "use of saved file" function, which prints, by the printer 210, or sends, to an external via the network I/F 208, image data saved on the HDD 204; and a "browser" function, which views, prints, and saves data on a web server via a web browser.

Figure 3:
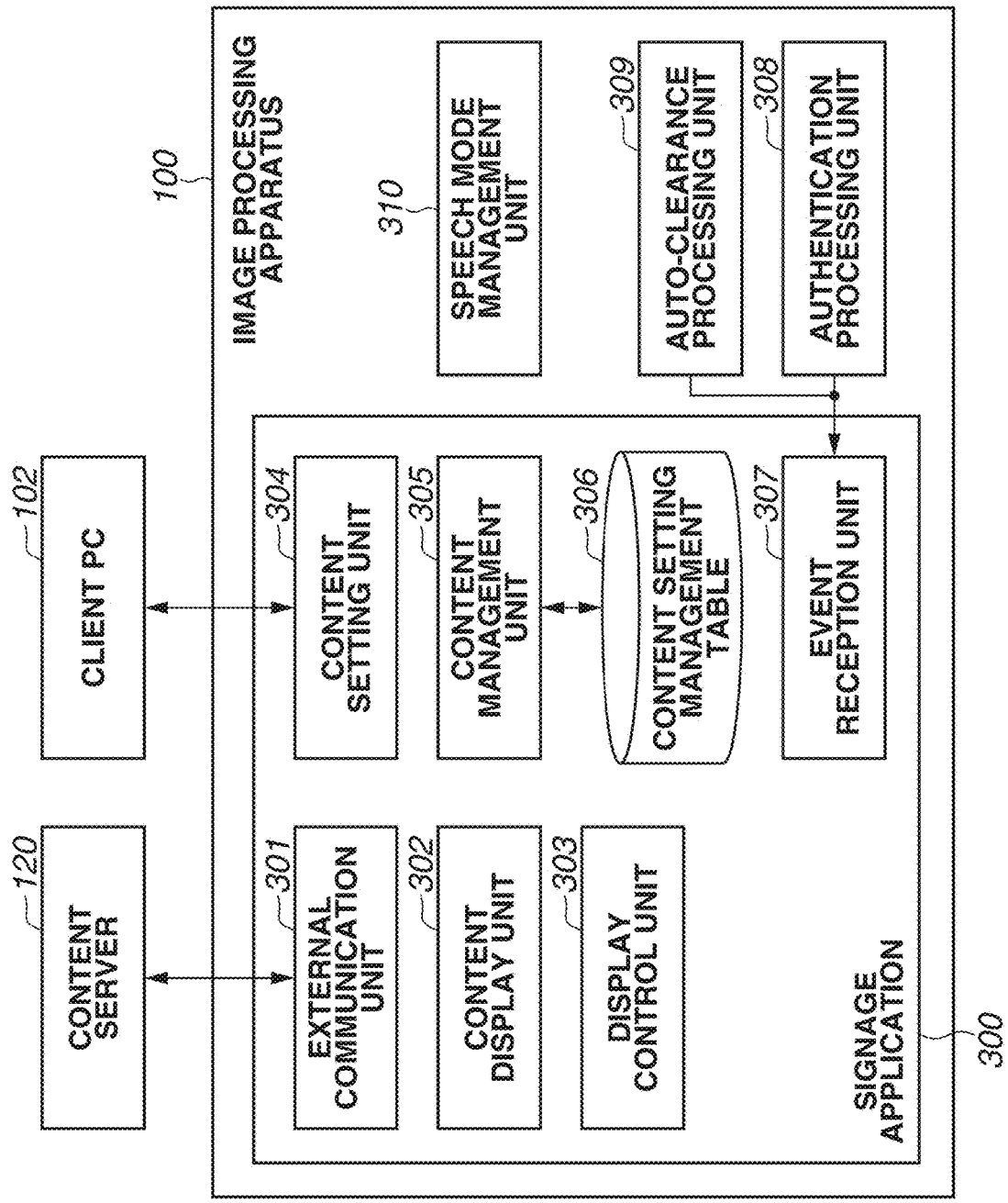
FIG. 3 is a block diagram illustrating a software configuration of the image processing apparatus.

FIG. 3 is a diagram used to describe a software configuration of the entire system including the image processing apparatus 100. Each functional unit illustrated in FIG. 3 is implemented by the CPU 201 included in the image processing apparatus 100 reading out and executing a control program stored in the ROM 202 or the HDD 204.

The image processing apparatus 100 includes functions of a signage application 300, an authentication processing unit 308, an auto-clearance processing unit 309, and a speech mode management unit 310.

The signage application 300 is a built-in software program loaded in the image processing apparatus 100. The signage application 300 includes an external communication unit 301, a content display unit 302, a display control unit 303, a content setting unit 304, a content management unit 305, a content setting management table 306, and an event reception unit 307.

The external communication unit 301 performs communication with the content server 120 to acquire content or a content setting management table managed by the content server 120. Moreover, the communication protocol used to perform communication between the external communication unit 301 and the content server 120 includes SMB, WebDAV, and HTTP. SMB is an abbreviation for Server Message Block, and WebDAV is an abbreviation for Web-based Distributed Authoring and Versioning. Moreover, HTTP is an abbreviation for Hypertext Transfer Protocol. Furthermore, another communication protocol, such as an e-mail or a file transfer protocol (FTP), can be employed.

The content display unit 302 reads a cache of content generated in the content server 120 or the HDD 204 into the RAM 203 and outputs content to the operation unit 209. Content refers to data that is viewable via a web browser, such as text data, Hypertext Markup Language (HTML), an image file (for example, Joint Photographic Experts Group (JPEG), graphics interchange format (GIF), Portable Network Graphics (PNG), or bitmap (BMP)), and a moving image file.

The display control unit 303 switches screens, which are managed for each application, and outputs the screen to the operation unit 209.

The content setting unit 304 sets content which is to be displayed. Specifically, the content setting unit 304 allows the user to access a web server included in the image processing apparatus 100 using a web browser included in the client PC 102 and set content which is to be displayed when a specific event occurs. When setting of content is completed, the content setting unit 304 transmits a content setting update event to the event reception unit 307.

FIG. 5A, FIG. 5B, FIG. 5C, FIG. 5D, FIG. 5E, FIG. 5F, and FIG. 5G are diagrams illustrating examples of screens for setting content. As mentioned above, when the user accesses the web server of the image processing apparatus 100 using the web browser included in the client PC 102, these screens are displayed.

FIG. 5A is a diagram illustrating a screen example of an authentication screen for inputting authentication information. When the user enters a user name and a password via the authentication screen and presses a login button, the authentication processing unit 308 performs user authentication and login processing. Here, when the user having administrative right logs in, a screen illustrated in FIG. 5B is displayed.

FIG. 5B is a diagram illustrating an example of a screen for allowing the user having administrative right to perform various settings concerning the image processing apparatus 100. When any one of setting items is selected from among a menu located at the left-hand side of the screen, detailed setting items corresponding to the selected setting item are displayed at the right-hand side of the screen. For example, when the user selects a setting item "license/others" 501, a screen illustrated in FIG. 5C is displayed.

Figure 5E:
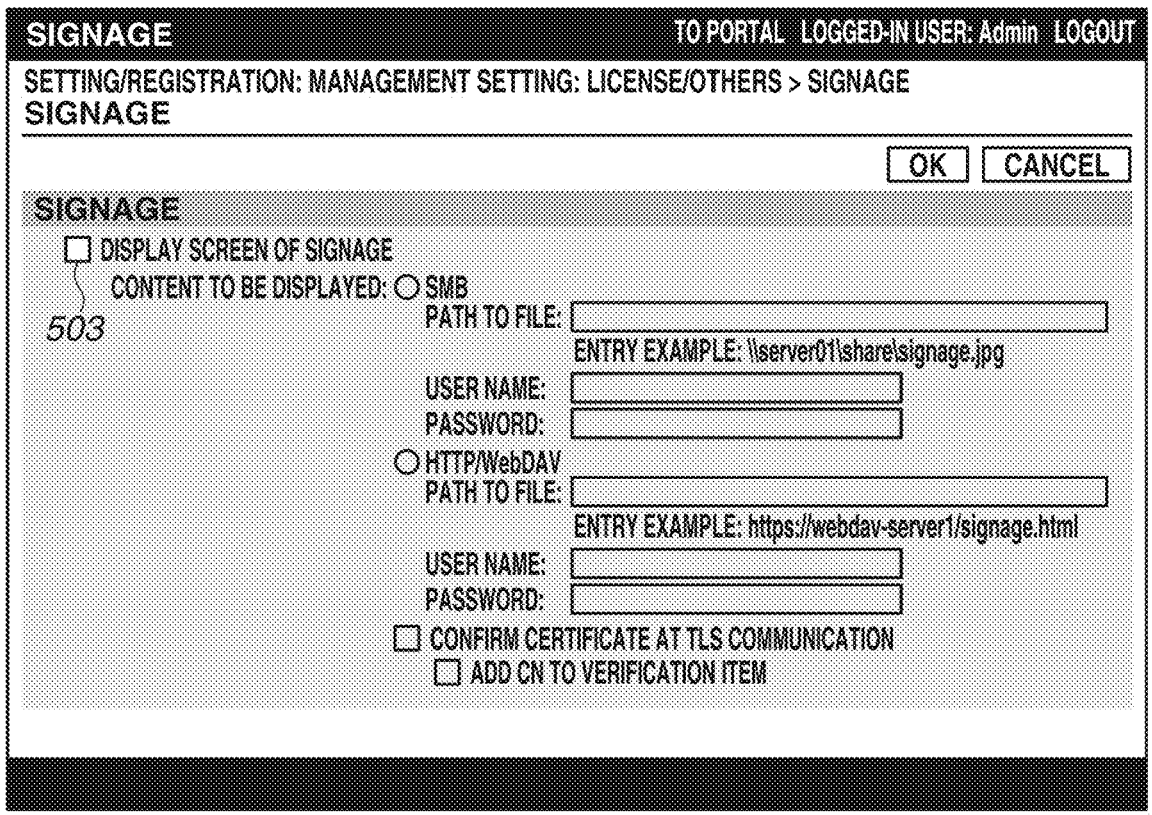

FIG. 5C is a diagram illustrating an example of a screen for performing detailed setting concerning license/others. Various setting items including a setting item 502 have hyperlinks, and, when a setting item is selected, a web page corresponding to the selected setting item is displayed. When the user selects the setting item 502, setting screens of the signage application 300 illustrated in FIG. 5E to FIG. 5G are displayed.

On the other hand, in FIG. 5A, when the user having no administrative right logs in, a screen illustrated in FIG. 5D is displayed.

FIG. 5D is a diagram illustrating an example of a screen for allowing the user having no administrative right to perform various settings concerning the image processing apparatus 100. In this screen, since the setting item 501, which is displayed in the screen illustrated in FIG. 5B, is not displayed, the user having no administrative right is not able to cause the setting screens of the signage application 300 to be displayed. In this way, only the user having administrative right is allowed to cause the setting screens of the signage application 300 to be displayed, so that the user allowed to perform setting of content can be limited to the administrator. Furthermore, while, in the present exemplary embodiment, the user allowed to perform setting of content is limited to a user having administrative right on the entire image processing apparatus 100, a configuration in which general users having no administrative right are allowed to perform setting can be employed. Moreover, apart from the administrative right on the entire image processing apparatus 100, a configuration in which an administrative right exclusive for the signage application 300 is provided and only the user having such an administrative right is allowed to perform setting of content can be employed.

Figure 5F:
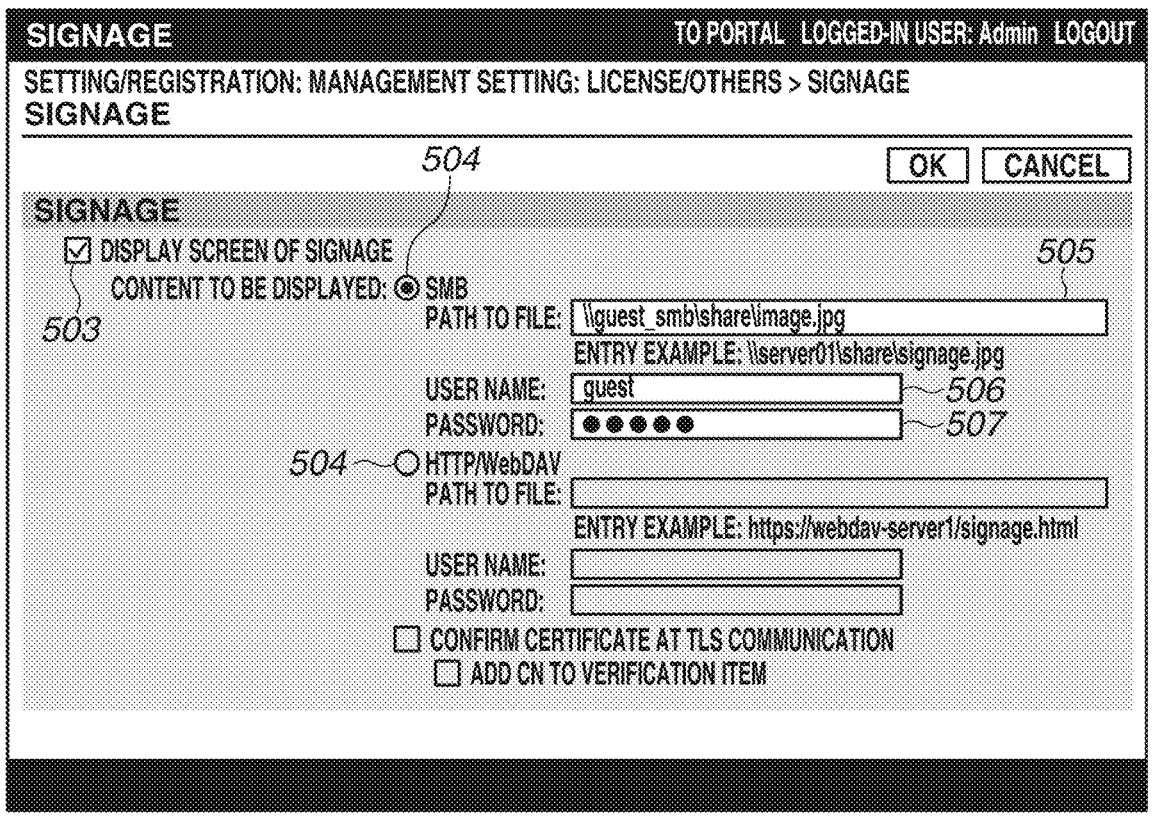
Figure 5G:
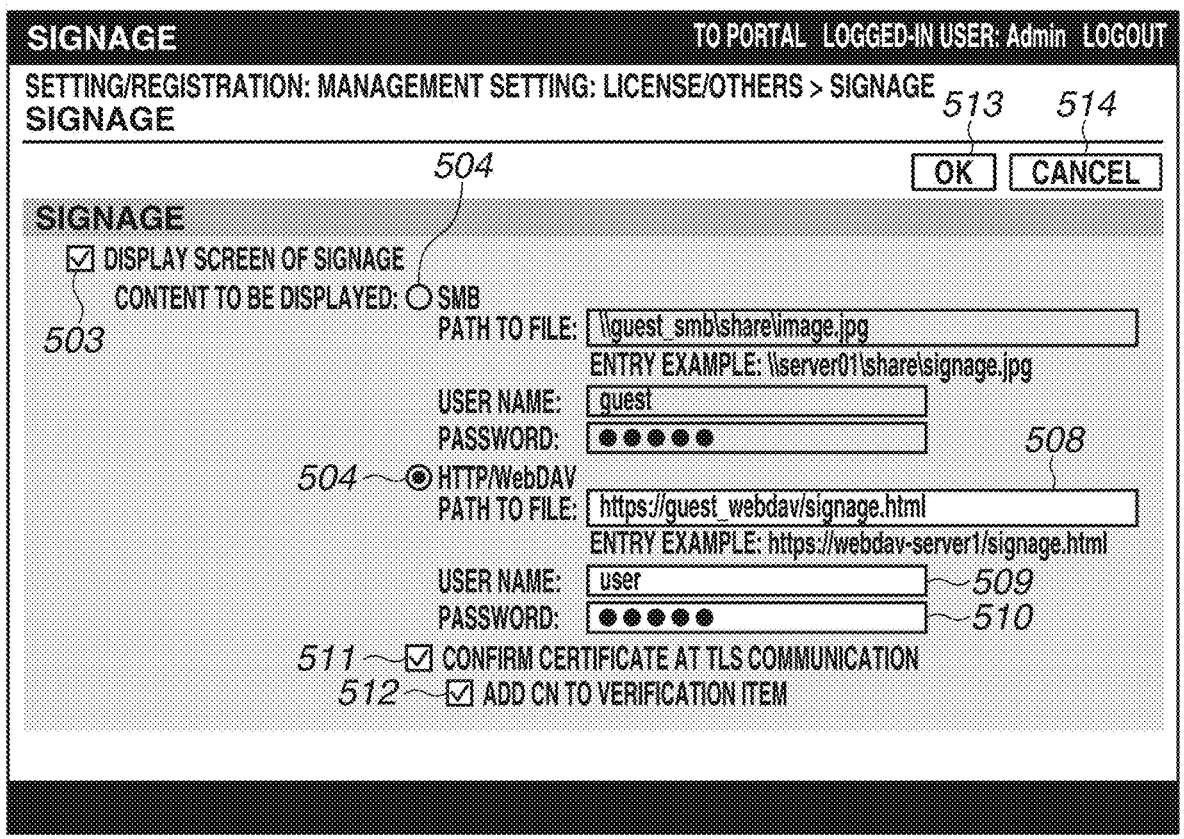

FIG. 5E to FIG. 5G are diagrams illustrating setting screens of the signage application 300. A checkbox 503 is a setting item for switching ON/OFF of displaying of the signage application 300. When the checkbox 503 is not checked, the other setting items are displayed in a shaded manner as illustrated in FIG. 5E and are thus made unavailable for inputting. When the checkbox 503 is checked, as illustrated in FIG. 5F and FIG. 5G, settable items are displayed in a non-shaded manner.

Radio buttons 504 are buttons used to select a communication protocol for communication between the external communication unit 301 and the content server 120. When the radio button 504 corresponding to SMB is selected, as illustrated in FIG. 5F, shading of the setting items concerning SMB is canceled and each setting item becomes available for inputting. When the radio button 504 corresponding to HTTP/WebDAV is selected, as illustrated in FIG. 5G, shading of the setting items concerning HTTP/WebDAV is canceled and each setting item becomes available for inputting.

A text box 505 is an entry field into which to input a path of content which is to be displayed when the communication protocol is set to SMB. The path is a character string indicating the storage location of content, and, in the case of SMB, is, for example, a computer name, a folder name, and a file name delimited with the yen sign or backslash. A text box 506 is an entry field into which to input a user name used to access a path of content which is to be displayed when the communication protocol is set to SMB.

A text box 507 is an entry field into which to input a password used to access a path of content which is to be displayed when the communication protocol is set to SMB.

A text box 508 is an entry field into which to input a path of content which is to be displayed when the communication protocol is set to HTTP/WebDAV. The path in the case of HTTP/WebDAV is, for example, a computer name, a folder name, and a file name delimited with the slash, indicating the storage location of content.

A text box 509 is an entry field into which to input a user name used to access a path of content which is to be displayed when the communication protocol is set to HTTP/WebDAV.

A text box 510 is an entry field into which to input a password used to access a path of content which is to be displayed when the communication protocol is set to HTTP/WebDAV.

Checkboxes 511 and 512 are setting items for inputting settings in a case where encrypted communication is performed when the communication protocol is set to HTTP/WebDAV.

An OK button 513 is a button used to cause the items set in the boxes and buttons 503 to 512 to be stored in the content setting management table 306, which is described below. When the OK button 513 is pressed, the items set in the boxes and buttons 503 to 512 are stored in the content setting management table 306, and the screen illustrated in FIG. 5C is resumed.

A cancel button 514 is a button used to resume the screen illustrated in FIG. 5C without causing the items set in the boxes and buttons 503 to 512 to be stored in the content setting management table 306.

In this way, the user can set and register specific information for specifying content to be displayed by the signage application 300 via the setting screens illustrated in FIG. 5A to FIG. 5G. Furthermore, while, in the present exemplary embodiment, an example in which content is set via the client PC 102 is described, a configuration in which content is set via the operation unit 209 of the image processing apparatus 100 can be employed.

The description refers back to FIG. 3. The content management unit 305 stores, for example, a path of content in the content setting management table 306 based on the content set by the content setting unit 304. Moreover, the content management unit 305 acquires the setting stored in the content setting management table 306 and communicates the acquired setting to the content display unit 302.

The content setting management table 306 is a management table used to manage setting values of the signage application 300 set by the content setting unit 304.

FIG. 6 is a diagram illustrating an example of the content setting management table 306. Here, a content setting management table 306 generated and updated based on the content input via the setting screen illustrated in FIG. 5G is illustrated. Furthermore, the content setting management table 306 can be stored in the HDD 204 of the image processing apparatus 100 or can be stored in the content server 120.

A column 601 indicates a key corresponding to each setting item of the signage application 300. A column 602 indicates a value corresponding to the key of each setting item of the signage application 300. The content management unit 305 acquires the setting value 602 concerning each setting item by referring to the content setting management table 306 based on the key 601.

The setting item 603 is an item indicating ON/OFF of displaying of the signage application 300, in which "0"

represents OFF and "1" represents ON. When setting of the checkbox 503 illustrated in FIG. 5E to FIG. 5G is updated, such a value is updated.

The setting item 604 is an item indicating a communication protocol used for communication between the external communication unit 301 and the content server 120, in which "0" represents SMB and "1" represents HTTP/WebDAV. When setting of the radio button 504 illustrated in FIG. 5F and FIG. 5G is updated, such a value is updated.

The setting item 605 is an item indicating a path of content which is to be displayed when the communication protocol is set to SMB. When setting of the text box 505 illustrated in FIG. 5F is updated, such a value is updated.

The setting item 606 is an item indicating a user name used to access a path of content which is to be displayed when the communication protocol is set to SMB. When setting of the text box 506 illustrated in FIG. 5F is updated, such a value is updated.

The setting item 607 is an item indicating a password used to access a path of content which is to be displayed when the communication protocol is set to SMB. When setting of the text box 507 illustrated in FIG. 5F is updated, such a value is updated.

The setting item 608 is an item indicating a path of content which is to be displayed when the communication protocol is set to HTTP/WebDAV. When setting of the text box 508 illustrated in FIG. 5G is updated, such a value is updated.

The setting item 609 is an item indicating a user name used to access a path of content which is to be displayed when the communication protocol is set to HTTP/WebDAV. When setting of the text box 509 illustrated in FIG. 5G is updated, such a value is updated.

The setting item 610 is an item indicating a password used to access a path of content which is to be displayed when the communication protocol is set to HTTP/WebDAV. When setting of the text box 510 illustrated in FIG. 5G is updated, such a value is updated.

The setting items 611 and 612 are items indicating settings in a case where encrypted communication is performed when the communication protocol is set to HTTP/WebDAV. When settings of the checkboxes 511 and 512 illustrated in FIG. 5G are updated, such values are updated.

The description refers back to FIG. 3. The event reception unit 307 receives various events communicated from the authentication processing unit 308 and the auto-clearance processing unit 309.

The authentication processing unit 308 causes the operation unit 209 or the client PC 102 to display an authentication screen and performs user authentication using authentication information, such as a user identifier (ID) and a password, input by the user. If the user authentication is successful, the authentication processing unit 308 performs login processing to allow the user to log in to the image processing apparatus 100. When an instruction for logout is received, the authentication processing unit 308 performs logout processing to cause the logged-in user to log out of the image processing apparatus 100. An instruction for logout is issued when a logout button displayed on the operation unit 209 has been pressed by the user or when auto-clearance processing, which is described below, has been performed. When login processing or logout processing is performed, the authentication processing unit 308 transmits an event indicating that such processing is performed (a login event or a logout event) to the event reception unit 307.

Moreover, the authentication processing unit 308 performs control of display timing of an authentication screen based on display setting of the authentication screen, as described below.

The auto-clearance processing unit 309 performs auto-clearance processing in a case where no operation on the operation unit 209 is performed for a predetermined time (hereinafter, the predetermined time being referred to as an "auto-clearance transition time"). The auto-clearance processing is processing for clearing the setting values/setting states on the displayed screen and restoring initial values. For example, if the user moves away from the front of the image processing apparatus 100 in the process of performing setting via the copy screen used for performing various settings concerning copying and, then, the auto-clearance transition time elapses, the setting values halfway set are cleared and the default setting values are resumed. The auto-clearance function enables preventing such a situation that the user would unconsciously take over the setting state set by a user who previously used the image processing apparatus 100 and perform, for example, copying with the unintended setting or the setting content which should not be imparted to a user who next uses the image processing apparatus 100 becomes viewable. When the auto-clearance processing is performed, the auto-clearance processing unit 309 transmits an auto-clearance event to the event reception unit 307. Moreover, when the auto-clearance processing is performed, the authentication processing unit 308 performs logout processing for the logged-in user to log out. Furthermore, the user is allowed to set the auto-clearance transition time to an optional value.

Moreover, the user is allowed to set a screen serving as a transition destination at the time of auto-clearance processing. In a case where an initial screen is set as a screen serving as a transition destination at the time of auto-clearance processing, the screen of the operation unit 209 switches from the screen displayed until then to the initial screen. The initial screen is a screen previously set by the user as a screen that is to be displayed at the time of startup. For example, a main menu screen for selecting a function to be displayed from among a plurality of functions (applications and functions) included in the image processing apparatus 100 or an application screen corresponding to each function can be set. In the following description, an example in which an initial screen is set as the screen serving as a transition destination at the time of auto-clearance processing and a main menu screen is set as the initial screen is described.

When a predetermined operation is performed by the user via the operation unit 209, the speech mode management unit 310 displays, on the operation unit 209, a speech mode screen for selecting a speech mode to be activated. The predetermined operation is, for example, a long press of a certain button. The speech mode management unit 310 keeps the speech mode in an enabled state while the speech mode is being activated. Details of the speech mode are described below.

<Setting of User Authentication>

FIG. 7A, FIG. 7B, FIG. 7C, and FIG. 7D are diagrams illustrating examples of screens used to perform setting concerning user authentication. The screens illustrated in FIG. 7A to FIG. 7D are screens that are able to be displayed only when the user having administrative right has logged in.

Figure 7A:
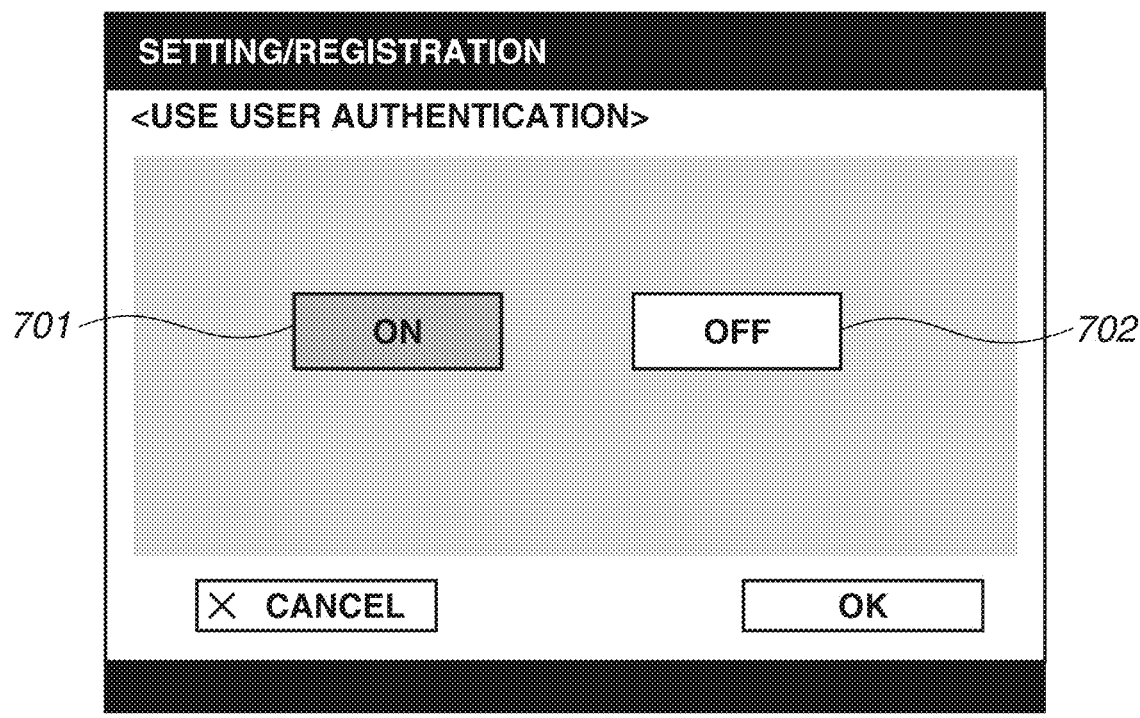
FIG. 7A, FIG. 7B, FIG. 7C, and FIG. 7D are diagrams illustrating examples of screens for performing setting concerning user authentication.

FIG. 7A illustrates a screen used to set whether to use user authentication. A button 701 is a button used to enable user authentication, and, when this button is selected, an authentication screen is displayed, so that user authentication becomes needed to use each function of the image processing apparatus 100. A button 702 is a button used to disable user authentication, and, when this button is selected, the authentication screen is not displayed, so that the user is allowed to use each function of the image processing apparatus 100 without need of user authentication.

Figure 7B:
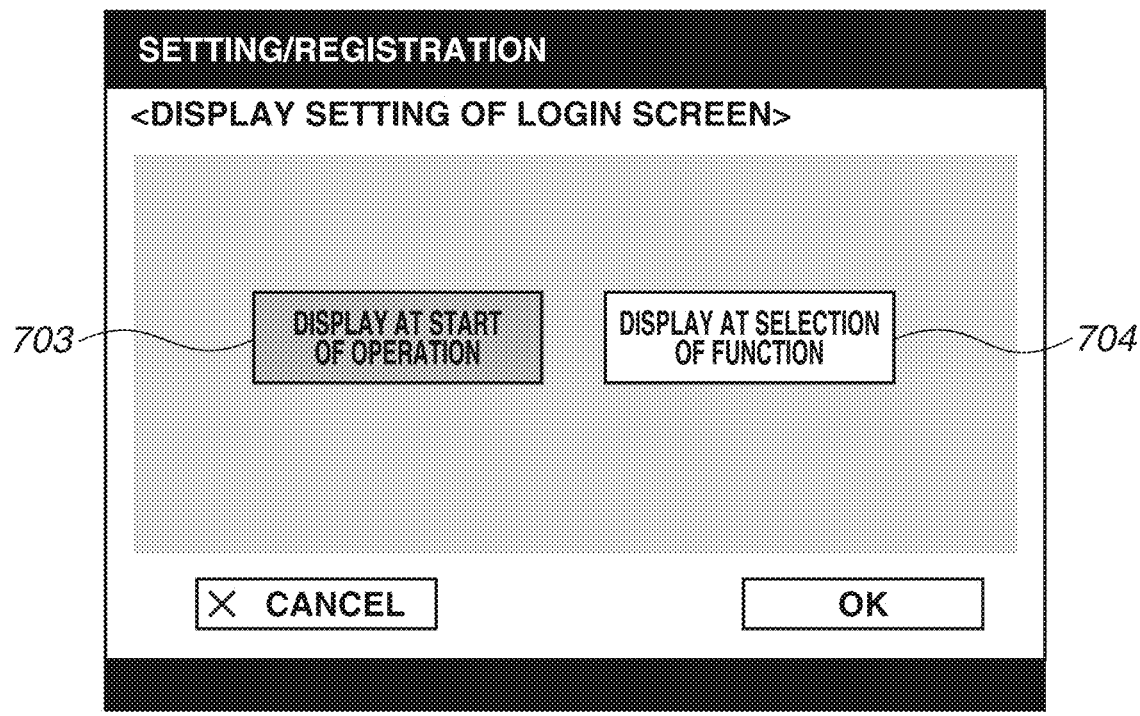
Figure 7C:
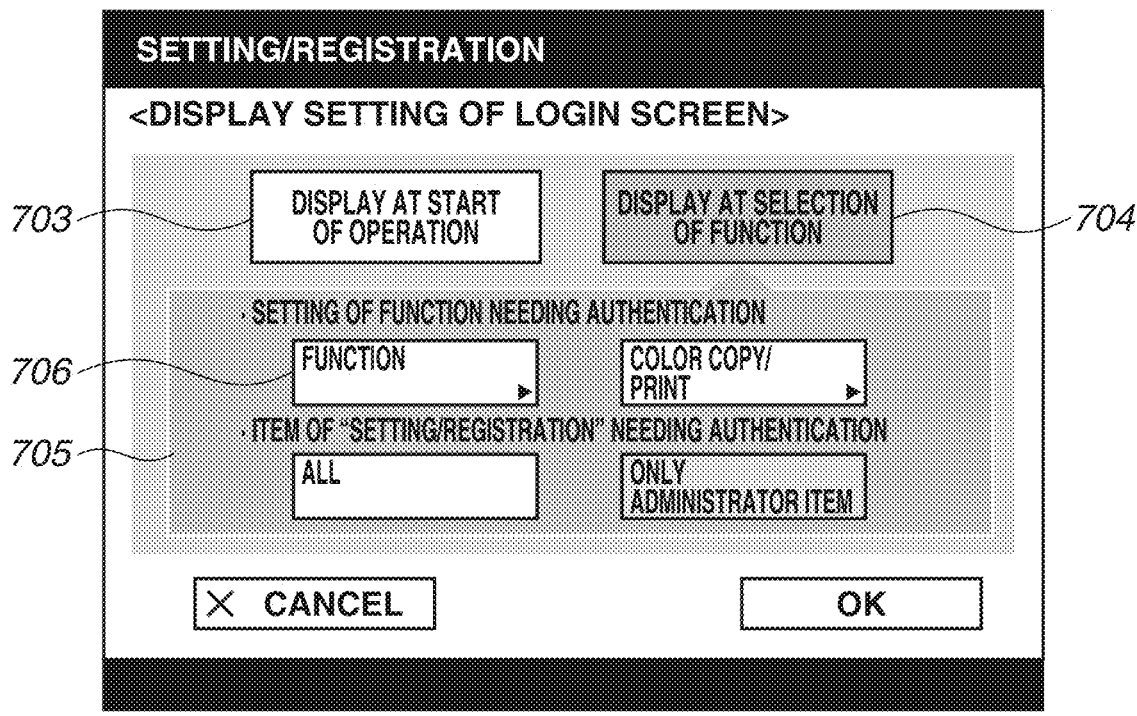

FIG. 7B and FIG. 7C illustrate screens used to switch display setting of the authentication screen, and, according to setting of this screen, timing at which user authentication is performed is determined. FIG. 7B illustrates a screen displayed when a button 703 is selected, and FIG. 7C illustrates a screen displayed when a button 704 is selected.

The button 703 is a button used to perform setting for displaying the authentication screen at the start of operation of the image processing apparatus 100, and, when this button is selected, the authentication screen is displayed when the user starts an operation, so that user authentication becomes needed. Thus, in a case where setting for displaying the authentication screen at the start of operation is performed, user authentication becomes needed at the beginning whatever function is used.

The button 704 is a button used to perform setting for displaying the authentication screen when each function is selected. When the button 704 is pressed, as illustrated in FIG. 7C, a screen 705 for selecting, for example, a function needing user authentication is displayed as a pop-up window. Here, when a button 706 is selected, switching to a screen illustrated in FIG. 7D is performed.

Figure 7D:
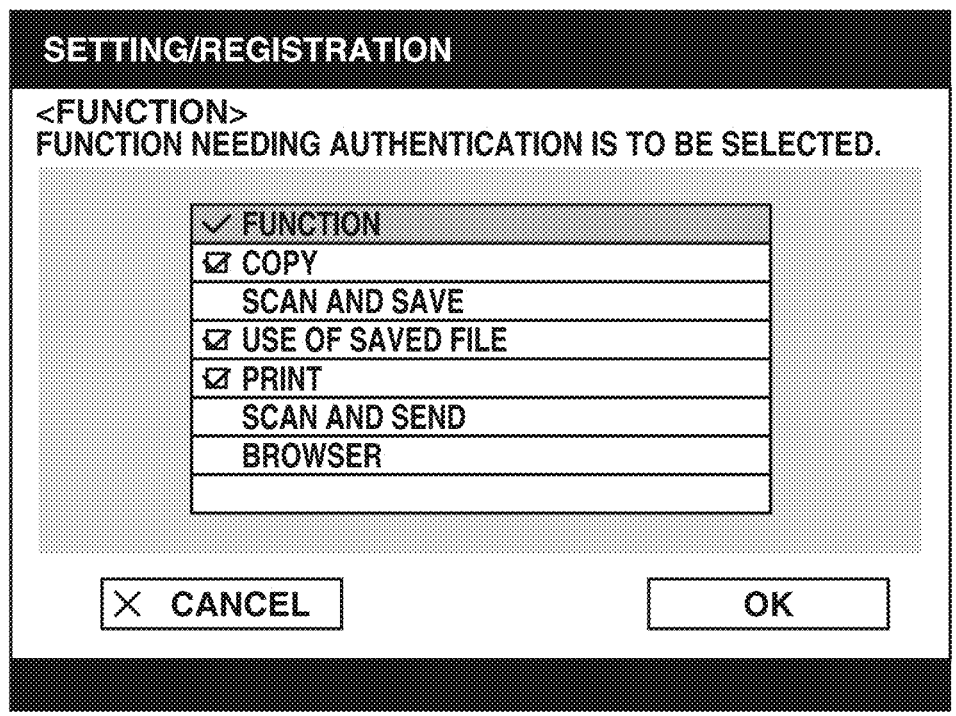

FIG. 7D illustrates a screen used to select a function needing user authentication from among a plurality of functions included in the image processing apparatus 100. With regard to a function selected as a function needing user authentication via the screen illustrated in FIG. 7D, the authentication screen is displayed when the user uses the selected function. On the other hand, with regard to a function not selected as a function needing user authentication, the user is allowed to use that function without need of user authentication. Referring to FIG. 7D, functions of "copy", "use of saved file", and "print" are selected as a function needing user authentication. On the other hand, functions of "scan and save", "scan and send", and "browser" are functions that do not need user authentication. In this way, in a case where the button 704 is selected, the authentication screen is not displayed at the start of operation of the image processing apparatus 100, but the authentication screen is displayed when the user uses each function depending on the selected function.

<Outline of Signage Application 300>

Next, the outline of a function of the signage application 300 in the present exemplary embodiment is described. First, prior to description of the function of the signage application 300, an operation performed by the image processing apparatus 100 in a case where the function of the signage application 300 is disabled is described.

FIGS. 8A1 and 8A2, FIGS. 8B1 and 8B2, and FIG. 8C are diagrams illustrating the flows of screens which are displayed on the operation unit 209 in a case where screen displaying of the signage application 300 is set to OFF.

FIGS. 8A1 and 8A2 and FIGS. 8B1 and 8B2 are diagrams illustrating the screen flows performed in a case where the button 701 has been selected in the screen illustrated in FIG. 7A, in other words, in a case where the user authentication function has been set to ON.

FIGS. 8A1 and 8A2 are diagrams illustrating the screen flow performed in a case where the button 703 has been selected in the screen illustrated in FIG. 7B, in other words, in a case where setting for displaying an authentication screen at the start of operation has been performed. When the user powers on the image processing apparatus 100 to start an operation, first, the authentication screen 801 is displayed, so that the user is required to input authentication information. Furthermore, the method for inputting authentication information can be manual entry by the user or another input method. For example, a configuration in which holding a non-contact communication card storing authentication information over an image processing apparatus enables the image processing apparatus to read the authentication information to perform user authentication can be employed. When the user authentication that is based on the authentication information input by the user via the authentication screen 801 is successful and the login processing is thus complete, a main menu screen 802, which is used to select an intended function from among a plurality of functions included in the image processing apparatus 100, is displayed. When the user presses one function selection button in the main menu screen 802, a screen corresponding to the selected function is displayed. For example, when the "copy" button is selected, a copy application screen 803, which is used to perform various settings concerning copying, is displayed. Moreover, when the "scan and save" button is selected, a "scan and save" application screen 804, which is used to select the destination to save scanned image data, is displayed. Furthermore, in a case where the auto-clearance transition time has elapsed without the user operating the operation unit 209, the auto-clearance processing is performed. When the auto-clearance processing is performed, the user automatically logs out, and the authentication screen 801 is displayed again. For example, when, while any one of the screens 802, 803, and 804 remains displayed, the auto-clearance transition time elapses without the user operating the operation unit 209, auto-clearance processing and logout processing are performed and switching to displaying of the authentication screen 801 is performed.

FIGS. 8B1 and 8B2 are diagrams illustrating the screen flow performed in a case where the button 704 has been selected in the screen illustrated in FIG. 7C, in other words, in a case where setting for displaying an authentication screen at the selection of a function has been performed. Moreover, as illustrated in FIG. 7D, it is assumed that functions of "copy", "use of saved file", and "print" are selected as the functions needing authentication. When the user powers on the image processing apparatus 100 and starts an operation via the operation unit 209, first, the main menu screen 802 is displayed. If the function selected by the user in the main menu screen 802 is a function selected as the function needing authentication, the authentication screen 801 is displayed prior to transition to an application screen corresponding to the selected function. For example, when a "copy" button is selected, the authentication screen 801 is displayed. When the user inputs authentication information and user authentication is successful, the copy application screen 803 is displayed. On the other hand, if the function selected in the main menu screen 802 is a function that does not need authentication, the authentication screen 801 is not displayed and transition to an application screen corresponding to the selected function is performed. For example, when a "scan and save" button is selected, the screen 804 is displayed. Moreover, when the auto-clearance transition time elapses without the user operating the operation unit 209 and the auto-clearance processing is thus performed, the user automatically logs out and the main menu screen 802 is resumed.

FIG. 8C is a diagram illustrating the screen flow performed in a case where the button 702 is selected in the screen illustrated in FIG. 7A, in other words, in a case where the user authentication function has been set to OFF. When the user powers on the image processing apparatus 100 and starts an operation via the operation unit 209, first, the main menu screen 802 is displayed. When the user presses one function selection button in the main menu screen 802, an application screen corresponding to the selected function is displayed. For example, when a "copy" button is selected, the screen 803 is displayed, and, when a "scan and save" button is selected, the screen 804 is displayed. Moreover, when the auto-clearance transition time elapses without the user operating the operation unit 209, the auto-clearance processing is performed, and the main menu screen 802 is resumed.

In this way, setting whether to perform user authentication via the screen illustrated in FIG. 7A enables switching whether to display an authentication screen. Moreover, performing setting via the screen illustrated in FIG. 7B enables switching the timing for displaying an authentication screen between displaying at the start of operation and displaying at the selection of a function. Furthermore, according to such setting concerning user authentication, a screen which is displayed at the time of auto-clearance is also switched.

Next, a screen which is displayed on the operation unit 209 in a case where screen displaying of the signage application 300 is set to ON is described.

Figure 9:
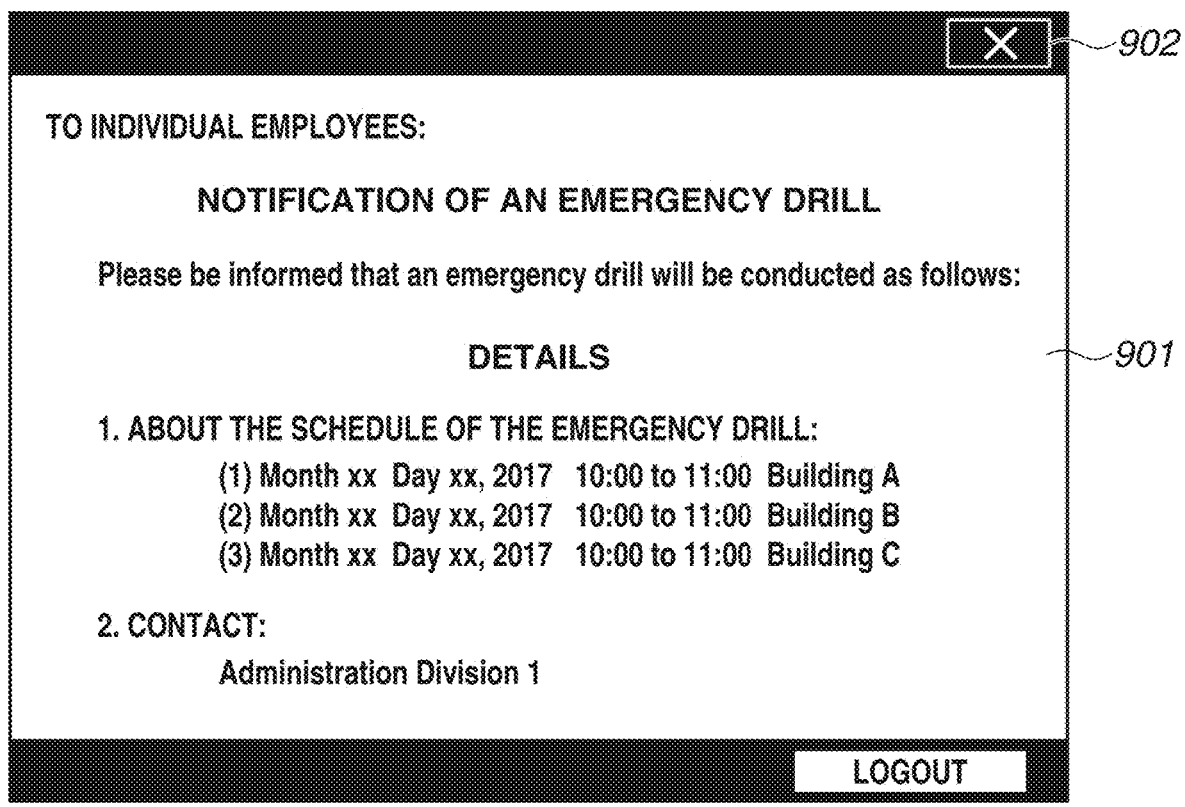
FIG. 9 is a diagram illustrating an example of a screen in which content previously registered by the signage application is displayed.

FIG. 9 is a diagram illustrating an example of a screen in which previously-set content is displayed by the signage application 300. Content 901 displayed in the screen is content acquired from the content server 120. Here, an HTML file denoted at "https://guest_webdav/signage.html" in the content setting management table 306 illustrated in FIG. 6 is displayed. When the user presses a close button 902, the content 901 stops being displayed. Furthermore, in FIG. 9, a notification of an emergency drill is displayed. In this way, registering a notification item to employees as content and causing the image processing apparatus 100 to display the content via the signage application 300 can be used to implement supporting sharing of information for employees or performing information control for companies.

Next, display timing of content, which is a feature of the signage application 300, is described. As mentioned above, the flow of screens to be displayed differs according to setting concerning user authentication via the screens illustrated in FIG. 7A to FIG. 7D. In the present exemplary embodiment, to effectively utilize the image processing apparatus 100 as a signage, in view of a difference in the screen flow, content is displayed at appropriate timing corresponding to setting concerning user authentication.

FIGS. 10A1 and 10A2, FIGS. 10B1 and 10B2, and FIGS. 10C1 and 10C2 are diagrams illustrating the flows of screens which are displayed on the operation unit 209 in a case where screen displaying of the signage application 300 is set to ON. The same screens as those illustrated in FIGS. 8A1 and 8A2 to FIG. 8C are assigned the respective same reference numerals, so that differences from the screen flows illustrated in FIGS. 8A1 and 8A2 to FIG. 8C are explicitly shown.

FIGS. 10A1 and 10A2 and FIGS. 10B1 and 10B2 are diagrams illustrating the screen flows performed in a case where the button 701 has been selected in the screen illustrated in FIG. 7A, in other words, in a case where the user authentication function has been set to ON.

FIGS. 10A1 and 10A2 are diagrams illustrating the screen flow performed in a case where the button 703 has been selected in the screen illustrated in FIG. 7B, in other words, in a case where setting for displaying an authentication screen at the start of operation has been performed. In comparison with FIGS. 8A1 and 8A2, when user authentication is successful based on authentication information input by the user via the authentication screen 801 and login processing is thus complete, a screen 1001 of the signage application 300 is displayed. This screen 1001 is the same as the screen illustrated in FIG. 9. Here, when a close button is pressed, the screen 1001 stops being displayed, and the main menu screen 802 is then displayed.

In this way, in a case where setting for displaying an authentication screen at the start of operation is performed, content is displayed by the signage application 300 at timing when the login of the user is completed. Therefore, since content is displayed when the user starts to use the image processing apparatus 100, the content can attract the attention of the user, so that, for example, a notification item in a company can be effectively communicated to the user.

FIGS. 10B1 and 10B2 are diagrams illustrating the screen flow performed in a case where the button 704 has been selected in the screen illustrated in FIG. 7C, in other words, in a case where setting for displaying an authentication screen at the selection of a function has been performed. Moreover, as illustrated in FIG. 7D, it is assumed that functions of "copy", "use of saved file", and "print" are selected as the functions needing authentication.

In this case, even when user authentication and login processing are complete based on information input via the authentication screen 801, any screen of the signage application 300 is not displayed. Instead, when the auto-clearance transition time elapses without the user operating the operation unit 209 and the auto-clearance processing is then performed, the screen 1001 of the signage application 300 is displayed. Then, when the close button is pressed, the screen 1001 stops being displayed, so that the main menu screen 802 is displayed.

In this way, in a case where setting for displaying an authentication screen at the selection of a function is performed via the screen illustrated in FIG. 7B, content is not displayed at timing when the user logs in, but content is displayed at timing when auto-clearance occurs. Even if a configuration in which content is displayed at timing when login is performed as in a case where setting for displaying an authentication screen at the start of operation is performed is employed, content is displayed in a case where a function needing user authentication is selected by the user. On the other hand, in a case where a function that does not need user authentication is selected, since login is not performed, content is not displayed. For example, a user who frequently uses the "scan and save" function but seldom uses the "copy" function has little opportunity to see content. To address this issue, setting display timing of content to the time of occurrence of auto-clearance enables a user who uses the image processing apparatus 100 after auto-clearance to see content when operating the operation unit 209 for the first time. Therefore, the image processing apparatus 100 is enabled to be used as a promotional terminal during a standby condition thereof regardless of the function to be used, so that, for example, a notification item can be effectively communicated to the user.

FIGS. 10C1 and 10C2 are diagrams illustrating the flow of screens performed in a case where the button 702 has been selected in the screen illustrated in FIG. 7A, in other words, the user authentication function has been set to OFF.

In this case, as in the case of the flow of screens illustrated in FIGS. 10B1 and 10B2, the screen 1001 of the signage application 300 is displayed at timing when auto-clearance occurs.

In this way, even if setting for not using the user authentication function is performed, content is displayed at timing when auto-clearance occurs, so that the image processing apparatus 100 can be effectively utilized as a signage.

As described above, previously registering content to be displayed enables displaying the registered content at timing when a specific event occurs. In particular, setting display timing of the signage application 300 according to setting concerning user authentication enables showing information to the user at appropriate timing, so that information can be more effectively communicated to the user. Specifically, in the case of setting for displaying an authentication screen at the start of operation, in other words, in the case of setting in which user authentication is required whichever function is used, content is displayed at timing when login of the user is completed. With this, a user who uses the image processing apparatus 100 is necessarily caused to see content. On the other hand, in the case of setting for displaying an authentication screen at the selection of a function, in other words, in the case of setting in which whether user authentication is required is determined for each function, and in the case of setting for not performing user authentication, content is displayed at timing when auto-clearance occurs. With this, a user who next uses the image processing apparatus 100 after the occurrence of auto-clearance is necessarily caused to see content. In this way, if, for example, information intended to be communicated to, for example, employees is previously registered as content, display timing of content is also automatically changed according to setting of user authentication, so that display timing does not need to be separately set and user convenience is increased.

<Outline of Speech Mode>

Next, the outline of the speech mode in the present exemplary embodiment is described.

Figure 11:
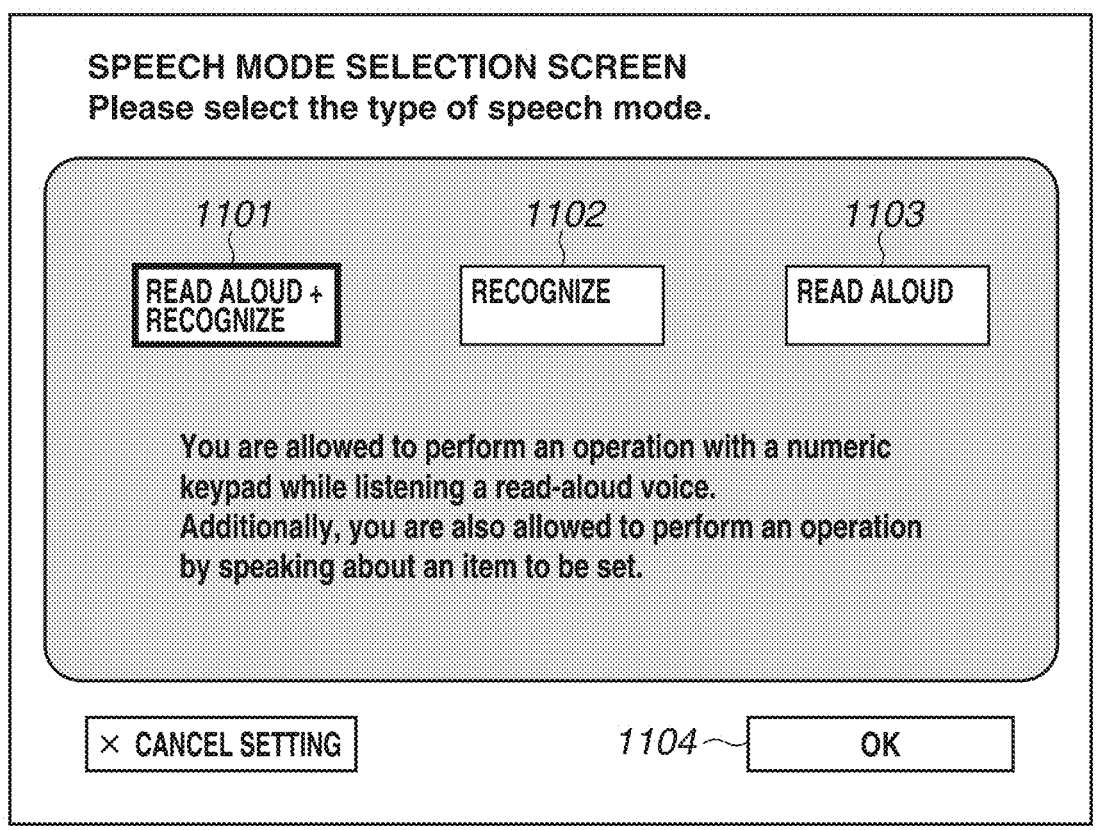
FIG. 11 is a diagram illustrating an example of a screen concerning activation of a speech mode.

FIG. 11 is a diagram illustrating an example of a screen concerning activation of the speech mode. Hereinafter, the method of activating the speech mode in the present exemplary embodiment is described with reference to FIG. 11.

FIG. 11 illustrates a speech mode selection screen which the speech mode management unit 310 displays on the operation unit 209. As mentioned above, when a predetermined operation, such as long press of a predetermined button, is performed via the operation unit 209, the speech mode selection screen is displayed. A button 1101 is a button used to set both a speech guidance function and a speech recognition function to ON. Here, the speech guidance function is a function to guide (read aloud) an operation on a screen by voice to operate the image processing apparatus 100. For example, in a copy screen used to perform various settings concerning copying, currently-set setting values are explained by voice. Moreover, the speech recognition function is a function to recognize speech uttered by the user and operate the image processing apparatus 100 according to a result of recognition. For example, a user utterance such as "copy" is recognized and a copy application is thus activated. A button 1102 is a selection button used to set only the speech recognition function to ON. A button 1103 is a button used to set only the speech guidance function to ON. A button 1104 is a button used to activate the speech mode selected via the button 1101, 1102, or 1103, and, when the button 1104 is pressed, the speech mode is activated with the selected function. Furthermore, FIG. 11 illustrates a state in which the button 1101 is selected.

FIGS. 12A1 and 12A2 and FIGS. 12B1 and 12B2 are diagrams illustrating the general flows of screens performed when the user who uses the speech mode operates the image processing apparatus 100. Here, to explain a basic behavior of the speech mode, a case where screen displaying of the signage application 300 is set to OFF is described. Furthermore, FIGS. 12A1 and 12A2 and FIGS. 12B1 and 12B2 are diagrams illustrating the flows of screens performed in a case where the button 703 is selected in the screen illustrated in FIG. 7B, in other words, in a case where setting for displaying an authentication screen at the start of operation is performed.

First, the user who uses the speech mode is mainly a person who is completely blind or a person who is partially sighted, and there are mainly two cases with regard to the timing at which to activate the speech mode. The first case (hereinafter referred to as a "case A") is the case of activating the speech mode when the authentication screen 801 is displayed for the first time after the image processing apparatus 100 is started up. The second case (hereinafter referred to as a "case B") is the case of activating the speech mode when the main menu screen 802 is displayed according to the completion of login in the user authentication performed with use of, for example, a non-contact communication card in the authentication screen 801. Each of the two cases is described as follows.

FIGS. 12A1 and 12A2 are diagrams illustrating the flow of screens in the case A.

When the user powers on the image processing apparatus 100 and the image processing apparatus 100 is thus started up, the authentication screen 801, which is used for the user to input authentication information, is first displayed. When the user who uses the speech mode performs a predetermined operation during displaying of the authentication screen 801, a speech mode selection screen 1301 is displayed. When the user performs an activation operation for the speech mode in the speech mode selection screen 1301, the speech mode is activated and the authentication screen 801 is displayed again. In the subsequent screens, an operation associated with reading-aloud by voice and/or speech recognition is performed according to the function of the activated speech mode. When the user authentication that is based on authentication information input by the user via the authentication screen 801 with, for example, voice is successful and the login processing is complete, the main menu screen 802 is displayed. When the user presses one function selection button in the main menu screen 802 or utters one function name, a screen corresponding to such a function is displayed. For example, when the user utters "copy", the copy application screen 803, which is used to perform various settings concerning copying, is displayed. Furthermore, in a case where the auto-clearance transition time elapses without the user operating the operation unit 209, the auto-clearance processing is performed. When the auto-clearance processing is performed, the user automatically logs out and the authentication screen 801 is displayed again.

FIGS. 12B1 and 12B2 are diagrams illustrating the flow of screens in the case B.

When the user powers on the image processing apparatus 100 and the image processing apparatus 100 is thus started up, the authentication screen 801, which is used for the user to input authentication information, is first displayed. When the user holds a non-contact communication card over the image processing apparatus 100, authentication information stored in the non-contact communication card is read by the image processing apparatus 100, and user authentication and login are thus complete, transition to the main menu screen 802 is performed. When the user performs a predetermined operation during displaying of the main menu screen 802, the speech mode selection screen 1301 is displayed. When the user performs an activation operation for the speech mode in the speech mode selection screen 1301, the main menu screen 802 is resumed. Then, as mentioned above, when the user presses one function selection button or utters one function name, a screen corresponding to such a function (for example, the copy application screen 803) is displayed. In a case where the auto-clearance transition time elapses without the user operating the operation unit 209, the auto-clearance processing is performed. When the auto-clearance processing is performed, the user automatically logs out and the authentication screen 801 is displayed again. Furthermore, transition to the speech mode selection screen 1301 can be performed not only from the main menu screen 802. For example, when a predetermined operation is performed during displaying of the screen 803, transition to the speech mode selection screen 1301 can also be performed.

<Issue in a Case where the Signage Application 300 and the Speech Mode are Coexistent>

Next, an issue in a case where the speech mode is activated with screen displaying of the signage application 300 in an ON state in the image processing apparatus 100 is described.

FIGS. 13A1 and 13A2 and FIGS. 13B1 and 13B2 are diagrams illustrating the flows of screens which are displayed in a case where setting is performed such that, when the speech mode is activated with screen displaying of the signage application 300 in an ON state, a screen of the signage application 300 is displayed. Here, for comparison with FIGS. 12A1 and 12A2 and FIGS. 12B1 and 12B2, the flows of screens in a case where the user authentication function is set to ON and setting for displaying an authentication screen at the start of operation is set are illustrated.

FIGS. 13A1 and 13A2 are diagrams illustrating the flow of screens in the above-mentioned case A. In comparison with FIGS. 12A1 and 12A2, when authentication information is input by the user via the authentication screen 801 and user authentication and login processing are complete, the screen 1001 of the signage application 300 is displayed. Here, since main users for the speech mode are persons who are completely blind and signages are not at all effective for persons who are completely blind, such a displayed screen can be regarded as unnecessary information. In addition, a person who is completely blind has been learning an operation procedure of an image processing apparatus by the number of operation steps. Therefore, if a change occurs in the number of operation steps in the image processing apparatus, it may become difficult for a person who is completely blind to operate the image processing apparatus. As mentioned above, in the case A, the timing when a person who is completely blind activates the speech mode is the start of operation of the image processing apparatus, in other words, the authentication screen 801. In that case, transition from the authentication screen 801 to the speech mode selection screen 1301 is performed, the authentication screen 801 is resumed after the speech mode is activated, and, then, a person who is completely blind proceeds with login processing using the speech mode. At this time, usually, while transition to the main menu screen 802 is performed after login processing, in a case where screen displaying of the signage application 300 is set to ON, the screen 1001 would be displayed before that time. When that happens, for example, a person who is completely blind and who remembers that reading aloud by voice of various functions in the main menu screen 802 will be performed may become unable to know what is happening, because reading aloud is still not started. Moreover, a person who is completely blind is unlikely to press the close button of the screen 1001, and is, therefore, unable to proceed with the next screen. The number of operation steps increasing in this way would lead to a reduction in operability of the image processing apparatus.

FIGS. 13B1 and 13B2 are diagrams illustrating the flow of screens in the above-mentioned case B. In comparison with FIGS. 12B1 and 12B2, when the user holds a non-contact communication card over the image processing apparatus 100 during displaying of the authentication screen 801 and user authentication and login processing are complete, the screen 1001 of the signage application 300 is displayed. Here, a person who is completely blind does not realize that the signage application 300 has been displayed. For example, a person who is completely blind does not realize that the screen 1001 of the signage application 300 has been displayed. Therefore, if a predetermined operation is performed in the same manner as usual, the speech mode selection screen 1301 is displayed and the user is allowed to activate the speech mode with an intended function. However, when the speech mode is activated, the screen 1001 of the signage application 300 would be displayed again. Here, a person who is completely blind usually remembers that an operation on the main menu screen 802 is to be performed after activation of the speech mode. If the screen 1001 is displayed in that case, the same issue as that in the case illustrated in FIGS. 13A1 and 13A2 would occur.

As mentioned above, if the signage application 300 and the speech mode are made coexistent, that coexistence may lead to a reduction in operability for the user who uses the speech mode. Therefore, in the following description, processing in which, even in a case where screen displaying of the signage application 300 is set to ON, when the speech mode is activated, the screen of the signage application 300 is prevented from being displayed is described.

<Processing Performed when the Speech Mode is Activated in a Case where Screen Displaying of the Signage Application 300 is Set to ON, which is a Feature of the Present Exemplary Embodiment>

Figure 4:
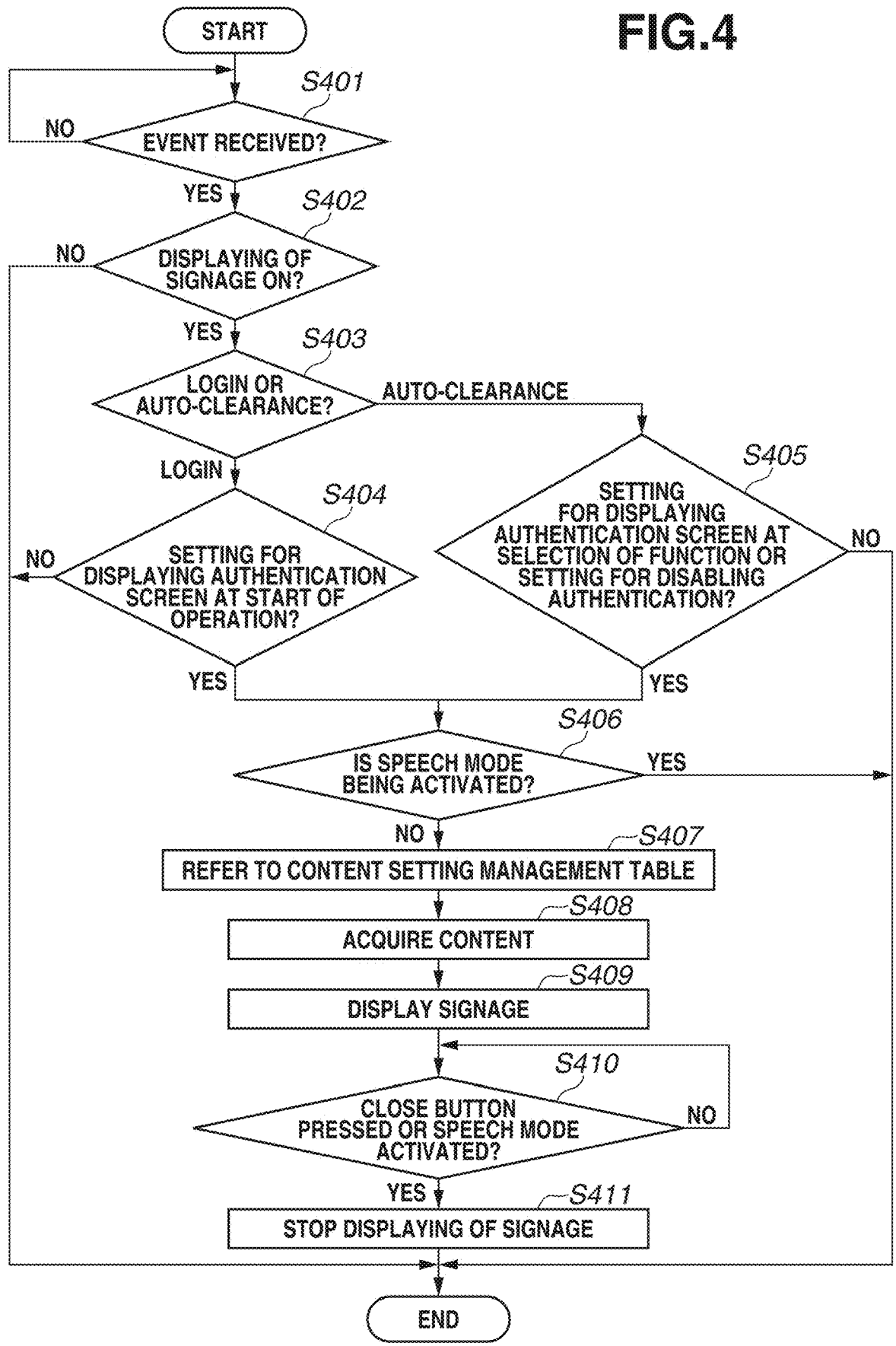
FIG. 4 is a flowchart illustrating a processing procedure performed by the image processing apparatus.

FIG. 4 is a flowchart illustrating display processing for content, which is performed by the CPU 201.

In step S401, the CPU 201 determines, via the event reception unit 307, whether a login event or an auto-clearance event has been received from the authentication processing unit 308 or the auto-clearance processing unit 309. If the CPU 201 determines that any one of the events has been received (YES in step S401), the processing proceeds to step S402. If the CPU 201 determines that neither of the events has been received (NO in step S401), the processing returns to step S401, thus waiting reception of such an event.

In step S402, the CPU 201 acquires, via the content management unit 305, a setting value corresponding to the key (setting item) 603 from the content setting management table 306, and determines whether displaying of the signage application 300 is set to ON. If the CPU 201 determines that the displaying is set to OFF (NO in step S402), the processing ends. If the CPU 201 determines that the displaying is set to ON (YES in step S402), the processing proceeds to step S403.

In step S403, the CPU 201 determines, via the event reception unit 307, whether the event received in step S401 is a login event or an auto-clearance event. If the CPU 201 determines that the received event is a login event (LOGIN in step S403), the processing proceeds to step S404. If the CPU 201 determines that the received event is an auto-clearance event (AUTO-CLEARANCE in step S403), the processing proceeds to step S405.

In step S404, the CPU 201 determines, via the authentication processing unit 308, whether display setting of an authentication screen is setting for displaying an authentication screen at the start of operation. If the CPU 201 determines that the display setting is not setting for displaying an authentication screen at the start of operation (NO in step S404), in other words, in the case of setting for displaying an authentication screen at the selection of a function, the processing ends. If the CPU 201 determines that the display setting is setting for displaying an authentication screen at the start of operation (YES in step S404), the processing proceeds to step S406.

In step S405, the CPU 201 determines, via the authentication processing unit 308, whether display setting of an authentication screen is setting for displaying an authentication screen at the selection of a function or setting for disabling user authentication. If the CPU 201 determines that the display setting is neither setting for displaying an authentication screen at the selection of a function nor setting for disabling user authentication (NO in step S405), in other words, in the case of setting for displaying an authentication screen at the start of operation, the processing ends. If the CPU 201 determines that the display setting is setting for displaying an authentication screen at the selection of a function or setting for disabling user authentication (YES in step S405), the processing proceeds to step S406.

In step S406, the CPU 201 determines, via the speech mode management unit 310, whether the speech mode is being activated, in other words, the speech mode is in an enabled state. If the CPU 201 determines that the speech mode is being activated (YES in step S406), the processing does not proceed to content display processing in step S407 and subsequent steps, but the processing ends. In this way, even when screen displaying of the signage application 300 is set to ON, if the speech mode is being activated at the time of login by the user or at the time of auto-clearance, which is display timing of content, displaying of content is not performed.

In step S407, the CPU 201 refers to the content setting management table 306 via the content management unit 305, acquires a content path, and communicates the content path to the content display unit 302.

In step S408, the CPU 201 acquires, via the content display unit 302, content from the content server 120 based on the content path acquired in step S402, and reads the content into the RAM 203.

In step S409, the CPU 201 performs switching to displaying of the screen of the signage application 300 via the display control unit 303. The content acquired in step S408 is output to the screen of the signage application 300 via the content display unit 302, so that the content is displayed on the operation unit 209.

In step S410, the CPU 201 determines whether the close button on the signage application 300 has been pressed via the operation unit 209 or whether the speech mode has been activated via the speech mode management unit 310. Here, the case where the speech mode has been activated corresponds to, for example, a case where, as described with reference to FIGS. 12B1 and 12B2 and FIGS. 13B1 and 13B2, the speech mode is not activated before the user logs in and the speech mode has been activated after the user logs in. If the CPU 201 determines that the close button has been pressed or the speech mode has been activated (YES in step S410), the processing proceeds to step S411, in which the CPU 201 causes the display control unit 303 to stop displaying the screen of the signage application 300.

FIGS. 14A1 and 14A2 and FIGS. 14B1 and 14B2 are diagrams illustrating the flows of screens which are displayed in a case where the processing illustrated in FIG. 4 is performed. Here, for comparison with FIGS. 12A1 and 12A2, FIGS. 12B1 and 12B2, FIGS. 13A1 and 13A2, and FIGS. 13B1 and 13B2, the flows of screens performed in a case where the user authentication function is set to ON and setting for displaying an authentication screen at the start of operation is set are illustrated.

FIGS. 14A1 and 14A2 are diagrams illustrating the flow of screens in the above-mentioned case A. In comparison with FIGS. 13A1 and 13A2, when authentication information is input by the user via the authentication screen 801 and user authentication and login processing are complete, the screen 1001 of the signage application 300 is not displayed, but the main menu screen 802 is displayed. Thus, the same flow of screens as that illustrated in FIGS. 12A1 and 12A2 is performed.

FIGS. 14B1 and 14B2 are diagrams illustrating the flow of screens in the above-mentioned case B. In comparison with FIGS. 13B1 and 13B2, the speech mode selection screen 1301 is displayed after the screen 1001 of the signage application 300 is displayed, and, when the speech mode is activated, switching to the main menu screen 802 is performed without the screen 1001 being resumed.

In this way, in a case where the user has logged in after activation of the speech mode, even when screen displaying of the signage application 300 is set to ON, content is not displayed. Moreover, in a case where the speech mode has been activated after displaying of content by the signage application 300, content is stopped from being displayed. In any of these cases, the same number of operation steps as that employed when at least screen displaying of the signage application 300 is set to OFF is obtained, so that a reduction in operability for a person who is completely blind can be prevented.

As described above, the image processing apparatus 100 according to the present exemplary embodiment determines whether the speech mode is being activated when display timing of content is reached, and does not display content if the speech mode is being activated. Moreover, in a case where the speech mode has been activated after displaying of content, the image processing apparatus 100 stops displaying content. This enables not only communicating appropriate information provided by the signage function to users who do not use the speech mode but also preventing operability from decreasing due to displaying of content with respect to some users who use the speech mode.

<Application to Other Accessibility Functions>

While, in the present exemplary embodiment, a case in which both the signage function and the speech mode operate has been described, the present disclosure can also be applied to another accessibility function.

Here, a screen magnification function, which is one of accessibility functions, is described. The screen magnification function is implemented by a screen magnification function management unit (not illustrated). When a predetermined operation, such as pinch-in or pinch-out operation, is performed on a screen via the operation unit 209, the screen magnification function management unit displays a screen displayed on the operation unit 209 in an enlarged manner. While displaying a screen displayed on the operation unit 209 in an enlarged manner, the screen magnification function management unit keeps the screen magnification function in an enabled state.

Figure 15A:
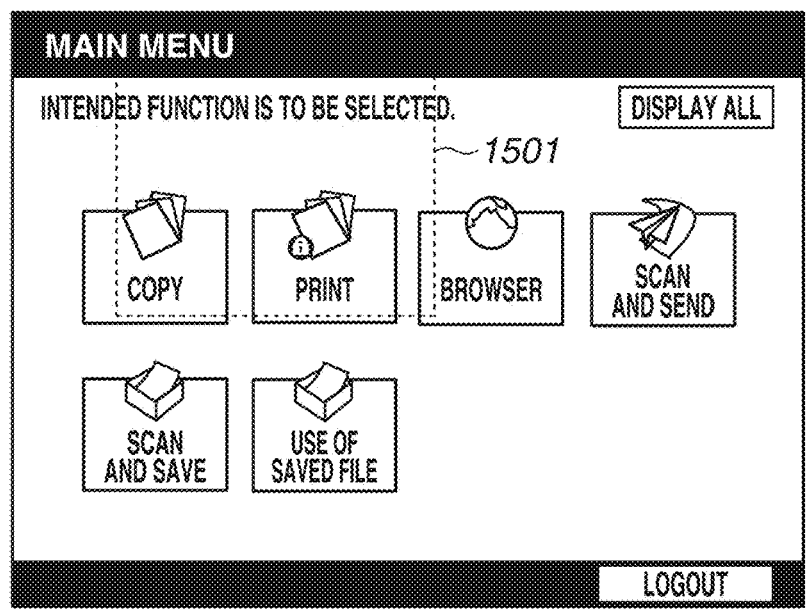
FIG. 15A, FIG. 15B, and FIG. 15C are diagrams illustrating examples of screen concerning an image magnification function.
Figure 15B:
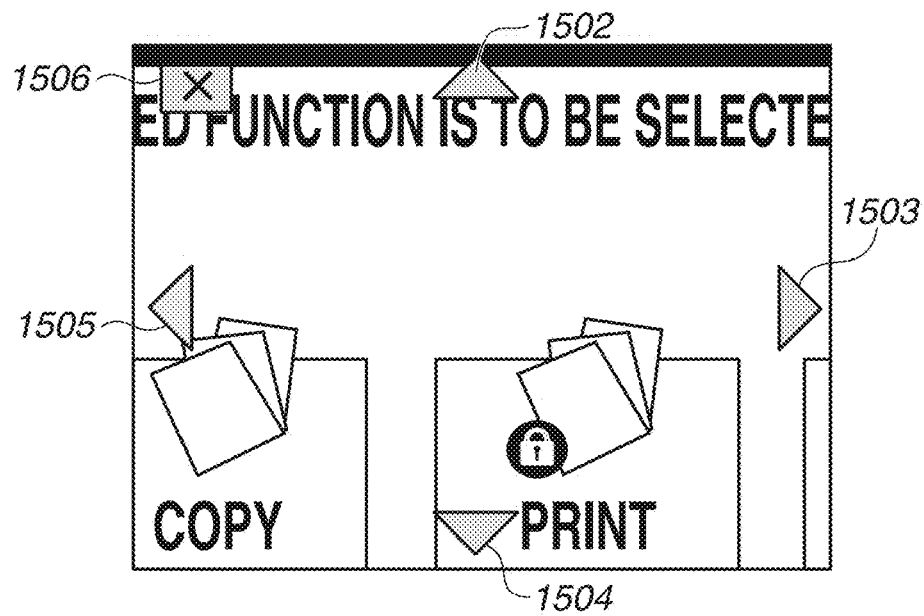
Figure 15C:
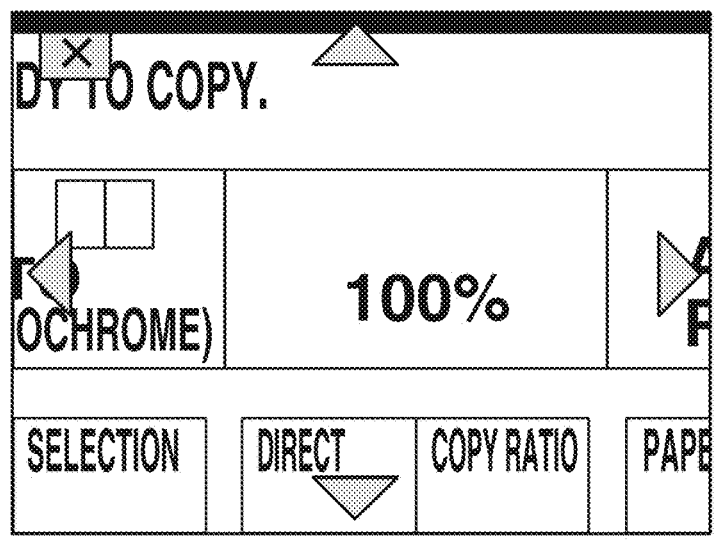

FIG. 15A, FIG. 15B, and FIG. 15C are diagrams illustrating examples of screens concerning the screen magnification function. FIG. 15A illustrates a main menu screen of the image processing apparatus 100. A frame line 1501 indicates a display region which is to be magnified from the main menu screen with use of the screen magnification function as illustrated in FIG. 15B. Furthermore, the frame line 1501 is drawn only for the purpose of illustration, and is not displayed in the actual main menu screen.

FIG. 15B illustrates a screen obtained by magnifying a part of the main menu screen, which is displayed by performing, for example, a pinch-in or pinch-out operation on the main menu screen illustrated in FIG. 15A. A button 1502 is a button used to move the display coordinates of the magnified screen upward. A button 1503 is a button used to move the display coordinates of the magnified screen rightward. A button 1504 is a button used to move the display coordinates of the magnified screen downward. A button 1505 is a button used to move the display coordinates of the magnified screen leftward. Furthermore, the movement of the display coordinates can be performed not only by pressing of the button 1502, 1503, 1504, or 1505 but also by a swipe operation on the screen. A button 1506 is a button used to stop displaying of the magnified screen and resume a normal magnification screen. For example, when the button 1506 in FIG. 15B is pressed, the screen illustrated in FIG. 15A is displayed.

FIG. 15C illustrates a screen which is displayed when the user presses the "copy" button in the screen illustrated in FIG. 15B. In this way, when any button is selected in the magnified screen, transition to the next screen is performed without the magnified display region being changed.

In this way, since the screen magnification function is used to display an intended region on the screen in an enlarged manner, operability for a person who is partially sighted can be increased. On the other hand, a person who is partially sighted may be unlikely to recognize details of content displayed by the signage function. Moreover, to stop displaying the screen 1001 of the signage application 300, it is necessary to press the close button 902. Therefore, a person who is partially sighted is required to move the display region of the magnified screen to cause the close button 902 to be displayed, and then to press the close button 902, so that a complicated operation is required.

Therefore, a configuration in which, even in a case where the screen magnification function is activated with screen displaying of the signage application 300 set to ON, the same processing as that performed at the time of activation of the speech mode is performed can be employed. Specifically, in steps S406 and S410 illustrated in FIG. 4, instead of determining whether the speech mode has been activated, it can be determined whether the screen magnification function has been activated.

In a case where an accessibility function other than the speech mode function or the screen magnification function is enabled, similar processing can also be performed. For example, the present disclosure can be applied to an accessibility function such as a screen color reversing function. Thus, in steps S406 and S410 illustrated in FIG. 4, it can be determined whether an accessibility function has been activated.

Moreover, to enable content to be displayed even for a user who uses an accessibility function, a configuration in which whether to display content in the process of the accessibility function being used can be set for each user can be employed.

Furthermore, while, in the description of the present exemplary embodiment, in a case where an accessibility function is enabled, setting of screen displaying of the signage application 300 is kept ON and content is prevented from being displayed, setting of the screen displaying can be set to OFF.

Moreover, while, in the present exemplary embodiment, an image processing apparatus capable of switching ON/OFF of the user authentication function has been described, an image processing apparatus having a user authentication function constantly set to ON can be employed. In that case, whether to set display timing of content to the time of login execution by the user or to the time of auto-clearance execution can be determined according to setting of whether to display an authentication screen at the start of operation or whether to display an authentication screen at the selection of a function. Moreover, while an image processing apparatus capable of switching whether to display an authentication screen at the start of operation or at the selection of a function in a case where the user authentication function is set to ON has been described, an image processing apparatus incapable of performing setting for displaying an authentication screen at the selection of a function can be employed. In that case, whether to set display timing of content to the time of login execution by the user or to the time of auto-clearance execution can be determined according to setting of ON/OFF of the user authentication function.

Moreover, while, in the present exemplary embodiment, in a case where the user authentication function is set to ON and setting for displaying an authentication screen at the start of operation is performed, display timing of content is the time of completion of login by the user, the display timing can be the time of logout by the user. As mentioned above, since logout processing is performed when the logout button has been pressed by the user or when the auto-clearance processing has been performed, a user who next uses the image processing apparatus after the former user logs out will see content. Therefore, content is displayed at timing similar to timing in a case where setting for displaying an authentication screen at the selection of a function is performed or in a case where user authentication is set to OFF, so that user convenience can be increased. Moreover, display timing of content in a case where the user authentication function is set to ON and setting for displaying an authentication screen at the start of operation is performed can be not the time of completion of login but the time of success of user authentication.

Furthermore, a configuration in which content is also displayed at the time of another event which occurs in the image processing apparatus 100 can be employed. For example, a screen of the signage application 300 can be displayed at the time of printing, at the start time of copy execution, at the start time of execution of a function to transmit image data generated by a scanner to an external (a scan and send function), and at the start time of execution of the use of saved file. Moreover, a screen of the signage application 300 can be displayed when the state of the image processing apparatus 100 has changed, for example, when a maintenance event such as out of toner has occurred.

Furthermore, while, in the present exemplary embodiment, the image processing apparatus 100 having a plurality of functions, such as a copy function and a scanner function, has been described as an example, the present disclosure can also be applied to an image processing apparatus having only some of the plurality of functions. Moreover, the present disclosure can also be applied to other types of information processing apparatuses, such as a personal computer, a personal digital assistance (PDA), a mobile phone, a facsimile (FAX) machine, a camera, a video camera, and an image viewer.

According to the above-described exemplary embodiment, an image processing apparatus capable of allowing users who do not utilize an accessibility function to enjoy the advantages of the signage function without decreasing the operability of users who utilize the accessibility function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-128047 filed Jun. 29, 2017, which is hereby incorporated by reference herein in its entirety.

What is claimed is:

1. An image processing apparatus comprising:
an operation panel;
a registration unit configured to register a predetermined content to be displayed on the operation panel by executing a signage application;
a reception interface circuit configured to receive an event wherein the predetermined content for the signage application is displayed in accordance with reception of at least a login event by the reception interface circuit; and
a display control unit configured to, according to the login event being received by the reception interface circuit, display the content for the signage application registered by the registration unit on the operation panel;
wherein, if a voice controlling function to control an operation of the image forming apparatus via voice is activated, when the login event is received by the reception interface circuit, the display control unit performs control not to display the content for the signage application on the operation panel and if the voice controlling function to control an operation of the image forming apparatus via voice is not activated, when the login event is received by the reception interface circuit, the display control unit performs control to display the content for the signage application on the operation panel; and
wherein the display control unit and the registration unit are implemented by using at least one or more processor.

2. The image processing apparatus according to claim 1, further comprising a first setting unit implemented by using at least one or more processor and configured to set whether to display the content,
wherein, if the voice controlling function to control an operation of the image forming apparatus via voice is activated, when setting for displaying the content is performed, the display control unit performs control not to display the content on the operation panel wherein the display content displayed on the operation panel turns an operation screen in accordance with receiving a user's input.

3. The image processing apparatus according to claim 1, wherein, if, after displaying the content on the operation panel, the voice controlling function to control an operation of the image forming apparatus via voice has been activated, the display control unit stops displaying the content.

4. The image processing apparatus according to claim 1, wherein the voice controlling function includes a function of explaining an operation on the operation panel by voice.

5. The image processing apparatus according to claim 1, wherein the voice controlling function includes a function of recognizing voice uttered by a user and operating the image processing apparatus according to a result of recognition.

6. The image processing apparatus according to claim 1, further comprising an authentication processing unit implemented by using at least one or more processor and configured to perform login processing to allow a user to log in to the image processing apparatus,
wherein the login event is communicated from the authentication processing unit.

7. The image processing apparatus according to claim 1, further comprising an auto-clearance processing unit implemented by using at least one or more processor and configured to perform auto-clearance processing for bringing a setting value in a screen displayed on the operation panel back to an initial value according to an operation on the operation panel not being performed for a predetermined time,
wherein the reception interface circuit receives an auto-clearance event which is communicated from the auto-clearance processing unit and wherein, if the voice controlling function to control an operation of the image forming apparatus via voice is activated, when the auto-clearance event is received by the reception interface circuit, the display control unit performs control not to display the content on the operation panel and if the voice controlling function to control an operation of the image forming apparatus via voice is not activated, when the auto-clearance event received by the reception interface circuit, the display control unit performs control to display the content on the operation panel.

8. The image processing apparatus according to claim 1, further comprising a second setting unit implemented by using at least one or more processor and configured to perform setting concerning user authentication for authenticating a user,
wherein display timing of the predetermined content is determined according to a setting concerning user authentication set by the second setting unit.

9. The image processing apparatus according to claim 8, wherein the second setting unit is configured to set whether to perform user authentication.

10. The image processing apparatus according to claim 8, wherein the second setting unit is configured to set whether to display an authentication screen, which is used to input authentication information required for user authentication, at start of operation of the image processing apparatus or at selection of any function of a plurality of functions included in the image processing apparatus.

11. The image processing apparatus according to claim 1, wherein the registration unit is configured to register the predetermined content to be displayed, based on information input via a web browser of an information processing apparatus connected to the image processing apparatus via a network.

12. The image processing apparatus according to claim 1, wherein the predetermined content that is able to be registered by the registration unit is content that is able to be viewed via a web browser.

13. The image processing apparatus according to claim 1, further comprising an acquisition unit implemented by using at least one or more processor and configured to acquire content registered by the registration unit from an external server,
wherein the display control unit displays the predetermined content acquired by the acquisition unit.

14. The image processing apparatus according to claim 1, further comprising:
a scanner configured to read an image on an original to generate image data; and
a printer configured to print an image on a sheet based on image data.

15. A control method for an image processing apparatus including an operation panel, a registration unit configured to register a predetermined content to be displayed on the operation panel, a reception interface circuit configured to receive an event wherein the predetermined content is displayed in accordance with reception of at least a login event by the reception interface circuit, and a display control unit configured to, according to the login event being received by the reception interface circuit, display the content registered by the registration unit on the operation panel, the control method comprising:
performing, if a voice controlling function to control an operation of the image forming apparatus via voice is activated, when the login event is received by the reception interface circuit, control not to display the content on the operation panel and if the voice controlling function to control an operation of the image forming apparatus via voice is not activated, when the login event is received by the reception interface circuit, the display control unit performs control to display the content on the operation panel.

16. A non-transitory computer-readable storage medium storing computable-executable instructions that, when executed by a computer, cause the computer to perform a control method for an image processing apparatus including an operation panel, a registration unit configured to register a predetermined content to be displayed on the operation panel, a reception interface circuit configured to receive an event wherein the predetermined content is displayed in accordance with reception of at least a login event by the reception interface circuit, and a display control unit configured to, according to the login event being received by the reception interface circuit, display the content registered by the registration unit on the operation panel, the control method comprising:
performing, if a voice controlling function to control an operation of the image forming apparatus via voice is activated, when the login event is received by the reception interface circuit, control not to display the content on the operation panel and if the voice controlling function to control an operation of the image forming apparatus via voice is not activated, when the login event is received by the reception interface circuit, the display control unit performs control to display the content on the operation panel.

17. An image processing apparatus comprising:
a display configured to display signage content
wherein in a case where the image processing apparatus is logged in by a user, the signage content is not displayed if a speech mode is enabled, and
the signage content is displayed if the speech mode is not enabled.

* * * * *